US011941957B2

(12) United States Patent
Marszalek et al.

(10) Patent No.: US 11,941,957 B2
(45) Date of Patent: Mar. 26, 2024

(54) SECURITY LOCKDOWN DEVICE AND METHOD

(71) Applicant: SENNCO SOLUTIONS INC., PLAINFIELD, IL (US)

(72) Inventors: Christopher Alan Marszalek, Plainfield, IL (US); Dale R. Liff, Montgomery, IL (US); Andy Reynolds, Aurora, IL (US); Daniel L. Horvath, Plainfield, IL (US); David Hefling, Plainfield, IL (US)

(73) Assignee: SENNCO SOLUTIONS INC, Plainfield, IL (US)

( * ) Notice: Subject to any disclaimer, the term of this patent is extended or adjusted under 35 U.S.C. 154(b) by 326 days.

(21) Appl. No.: 17/400,305

(22) Filed: Aug. 12, 2021

(65) Prior Publication Data

US 2021/0375106 A1 Dec. 2, 2021

Related U.S. Application Data

(63) Continuation-in-part of application No. 17/068,501, filed on Oct. 12, 2020, now Pat. No. 11,647,849.
(Continued)

(51) Int. Cl.
*G08B 13/06* (2006.01)
*E05C 19/16* (2006.01)
(Continued)

(52) U.S. Cl.
CPC ............ *G08B 13/06* (2013.01); *E05C 19/168* (2013.01); *G07C 9/00722* (2013.01); *G07C 9/00944* (2013.01); *G08B 7/06* (2013.01)

(58) Field of Classification Search
CPC . G08B 13/06; G07C 9/00722; G07C 9/00944
See application file for complete search history.

(56) References Cited

U.S. PATENT DOCUMENTS 1,615,120 A 1/1927 Fischer
3,749,279 A 7/1973 Ungerman
(Continued)

FOREIGN PATENT DOCUMENTS

CA 2328679 6/2002
CA 2328679 A1 * 6/2002 ............ A47F 3/002
(Continued)

OTHER PUBLICATIONS

U.S. Patent Office, English language version of the International Search Report, Form PCT/ISA/210 for International Application PCT/US2020/055282, dated Mar. 1, 2021 (2 pages).
(Continued)

*Primary Examiner* — Hoi C Lau
(74) *Attorney, Agent, or Firm* — Pauley Erickson & Swanson

(57) ABSTRACT

A security device for a retail store display and method of use. The security device includes a securing element moveable, relative the retail store surface, from a first position to a second position to allow customer access to a product. An electromagnetic or electromagnetic lock is configured to lock the securing element in the first position, to further limit the customer access afforded by the securing element. The lockdown provided by the secondary lockdown mechanism can be used for additional protection during times of need, such as after hours or if employees are not on the sales floor.

20 Claims, 27 Drawing Sheets

Related U.S. Application Data

(60) Provisional application No. 63/064,718, filed on Aug. 12, 2020, provisional application No. 62/915,441, filed on Oct. 15, 2019, provisional application No. 62/914,147, filed on Oct. 11, 2019.

(51) Int. Cl.
*G07C 9/00* (2020.01)
*G08B 7/06* (2006.01)

(56) References Cited

U.S. PATENT DOCUMENTS

| | | | | | |
|---|---|---|---|---|---|
| 4,130,326 | A | | 12/1978 | Hornblad | |
| 4,506,776 | A | | 3/1985 | Voegeli | |
| 5,392,025 | A | | 2/1995 | Figh et al. | |
| 5,671,362 | A | * | 9/1997 | Cowe | G07F 7/00 340/568.1 |
| 6,609,738 | B1 | * | 8/2003 | Roth | E05B 65/108 292/144 |
| 6,643,626 | B1 | * | 11/2003 | Perri de Resende | G06Q 20/20 705/16 |
| 9,567,776 | B2 | * | 2/2017 | Moock | F16M 13/00 |
| 9,970,217 | B2 | * | 5/2018 | Moock | G06F 1/1632 |
| 10,227,796 | B2 | * | 3/2019 | Moock | F16M 13/00 |
| 10,738,508 | B2 | * | 8/2020 | Moock | F16M 13/00 |
| 11,293,202 | B2 | * | 4/2022 | Moock | F16M 11/041 |
| 2005/0110373 | A1 | * | 5/2005 | Assmann | A47F 3/04 312/249.11 |
| 2008/0223177 | A1 | * | 9/2008 | van Koot | E05B 73/0023 81/3.07 |
| 2010/0050709 | A1 | * | 3/2010 | Neville | E05B 47/02 235/382 |
| 2010/0175438 | A1 | * | 7/2010 | Sankey | G08B 25/008 70/57.1 |
| 2011/0178630 | A1 | * | 7/2011 | Green | G07F 17/10 700/214 |
| 2011/0227735 | A1 | * | 9/2011 | Fawcett | G08B 13/14 340/568.8 |
| 2012/0047972 | A1 | * | 3/2012 | Grant | E05B 47/06 70/77 |
| 2012/0293330 | A1 | * | 11/2012 | Grant | G08B 21/0266 340/568.8 |
| 2013/0307668 | A1 | * | 11/2013 | Grant | G08B 13/02 340/5.25 |
| 2014/0118930 | A1 | * | 5/2014 | Sedon | G06F 21/88 361/679.56 |
| 2014/0266725 | A1 | * | 9/2014 | Berglund | G08B 13/149 340/568.8 |
| 2014/0362517 | A1 | * | 12/2014 | Moock | E05B 73/0082 248/553 |
| 2014/0366164 | A1 | * | 12/2014 | Hoefgen | G06F 21/88 726/34 |
| 2015/0013226 | A1 | * | 1/2015 | Artwohl | E05D 13/1261 49/31 |
| 2015/0061831 | A1 | * | 3/2015 | Sankey | G07C 9/29 70/393 |
| 2015/0091729 | A1 | * | 4/2015 | Phillips | G08B 13/149 340/568.2 |
| 2016/0222699 | A1 | * | 8/2016 | Grant | G07C 9/00896 |
| 2017/0107742 | A1 | * | 4/2017 | Moock | G08B 13/06 |
| 2017/0236401 | A1 | * | 8/2017 | Fawcett | G08B 13/2482 340/501 |
| 2017/0301198 | A1 | * | 10/2017 | Grant | G08B 21/0277 |
| 2017/0314296 | A1 | * | 11/2017 | Grant | G08B 25/008 |
| 2017/0372543 | A1 | * | 12/2017 | Grant | G07C 9/00857 |
| 2018/0047263 | A1 | * | 2/2018 | Burtness | G08B 13/1436 |
| 2018/0182216 | A1 | * | 6/2018 | Grant | G08B 13/149 |
| 2018/0258669 | A1 | * | 9/2018 | Moock | G06F 1/1632 |
| 2019/0178010 | A1 | * | 6/2019 | Moock | E05B 73/0082 |
| 2020/0163480 | A1 | * | 5/2020 | Waisanen | A47G 29/141 |
| 2021/0106148 | A1 | * | 4/2021 | Horvath | G08B 7/06 |
| 2021/0209048 | A1 | * | 7/2021 | Lo | G06F 1/1654 |
| 2021/0264754 | A1 | * | 8/2021 | Baker | E05B 73/0017 |
| 2021/0375106 | A1 | * | 12/2021 | Marszalek | A47F 3/002 |
| 2022/0381065 | A1 | * | 12/2022 | Blanchard | E05B 73/0082 |
| 2023/0169813 | A1 | * | 6/2023 | Fawcett | G07C 9/32 340/5.2 |

FOREIGN PATENT DOCUMENTS

| | | |
|---|---|---|
| EP | 1 777 665 A1 | 4/2007 |
| FR | 2 541 102 A1 | 8/1984 |

OTHER PUBLICATIONS

U.S. Patent Office, English language version of the Written Opinion of the ISA, Form PCT/ISA/237 for International Application PCT/US2020/055282, dated Mar. 1, 2021 (9 pages).

ISA/US, English language verison of the International Search Report, Form PCT/ISA/210, for International Application PCT/US2022/39938, dated Aug. 10, 2022 (04 pages).

ISA/US, Form PCT/ISA/237, Written Opinion of the International Searching Authority, for International Application PCT/US2022/39938, dated Aug. 12, 2022 (08 pages).

* cited by examiner

SECURITY LOCKDOWN DEVICE AND METHOD

CROSS REFERENCE TO RELATED APPLICATIONS

This application is a continuation-in-part of U.S. patent application Ser. No. 17/068,501, filed on 12 Oct. 2020, which claims the benefit of U.S. Provisional Patent Application, Ser. No. 62/914,147, filed on 11 Oct. 2019 and U.S. Provisional Patent Application, Ser. No. 62/915,441, filed on 15 Oct. 2019. This application also claims the benefit of U.S. Provisional Patent Application, Ser. No. 63/064,718, filed on 12 Aug. 2020. The parent and Provisional Applications are hereby incorporated by reference herein in their entirety and are made a part hereof, including but not limited to those portions which specifically appear hereinafter.

BACKGROUND OF THE INVENTION

Field of the Invention

The invention is related to security devices for deterring theft of retail inventory.

Description of the Prior Art

A growing problem for retail stores is theft of high value inventory directly from shelves. Thieves target retail stores to "sweep" shelves of valuable product by quickly assembling and removing as much of the product as possible, then exit the store with the product before store personnel or law enforcement have an opportunity to react. The product is either later returned for cash or sold outright.

Solutions to this problem have included locking down high value product in vaults or cabinets that require store personnel to unlock and physically provide the product to the customer. Other solutions include security wires that physically connect the product to store shelves or each other. Again, these solutions require store personnel to unlock and untether such product for the consumer. These solutions tend to discourage customers from purchases.

Still other solutions utilize mechanical dispensers connected to shelves that are configured to mechanically dispense one product at a time before resetting for dispensing another product. These solutions are not flexible for a variety of inventory and inflexibly require particular store shelves to be dedicated to particular inventory.

A need therefore exists to slow such thieves down, maintain inventory and alert store staff regarding interest while also enabling shoppers to examine and purchase product unencumbered by lock and key solutions.

Vendors, retailers and/or wholesalers also often display a sample device to a customer at, for example, a retail store and/or sales facility. The device may be a portable device, such as, for example, a tool, a smartphone, tablet, laptop, a digital camera, etc. The device is traditionally displayed in conjunction with a fixture, such as, for example, a cabinet, a table, a wall, a column, a shelf, and/or the like. A cable is often used to attach and/or secure the device to the fixture. Device security and the customer's ability to review the device are often at odds with each other, and thus there is a continuing need to provide improved security device to improve the customer experience.

SUMMARY OF THE INVENTION

The invention includes a security device and a method for securing a product for sale or display, such as a tool or an electronic device (e.g., a laptop computer, tablet, or phone), to, such as on, a fixture (e.g., a display shelf or similar surface). The invention provides a secured arrangement and a released access or viewing arrangement. Embodiments of this invention incorporate a lockdown of the security device through use of an electromagnet, or an electromagnetic lock or magnetic or mechanical equivalent.

In embodiments of this invention, a metal portion of the security device, either already integral to the security device or added thereon, serves as an armature, or attachment point, for an electromagnet or an electromagnetically actuated latch. The electromagnet can be mounted to the display fixture, such as being a connected part of the security device, and the moveable security element of the security device is near or in contact with the electromagnet. The lockdown feature can be used as a primary or secondary security feature. As a secondary security feature, the electromagnet of embodiments of this invention can be used to lockdown one or more products at desired times, such as at store closing, or when a salesperson is away from the area. Several forms of electromagnet release mechanisms can be used to release the electromagnet and the lockdown position, such as a simple switch, or an electronic control system that is RFID card-based or mobile app-based. Using an IP connection, data (e.g., lock status and/or use history) can be captured and sent to a network or the cloud for potential alerts and monitoring.

In some embodiments, a combination of electromagnet and a further release mechanism of the security device can be used to allow some freedom of movement when the electromagnet or electromagnetic latch is released, for example to allow the product to be accessed for sale, or picked up for closer inspection, but the security device would still secure the product, or adjacent products to, e.g., on or within, the display. This could allow for lighter security during daylight hours where the lockdown latch is released and, for example, a gate or tether secures the product(s), and heavier security at night where the latch is engaged and the products are locked down.

In some embodiments of the invention, an electric or electromagnetic latching mechanism is used. For example, an otherwise moveable security element of the security device, such as a swing gate or a tether connected to a product has a lock element (e.g., a pin, bar, groove or other feature) that engages an electric latching mechanism above, below, or within/behind the retail store display. The same control and monitoring options are available for this embodiment.

In embodiments of this invention, the security device can be operable by the retail user to allow the secured product to be accessed or moved between two security device positions, both secured to the display surface: a first position on the display surface (directly or via a device base), and a second lifted or elevated position off or otherwise away from the display that allows a consumer shopper to access the product, for purchasing or for better feel of the device for purchasing consideration.

The invention further includes a method of operating a security device, including engaging an electromagnet or electromagnetic lock to lock down the products against or within the display fixture, and releasing the electromagnet or lock to allow the products to be access or lifted from the display fixture.

To make the electromagnet system fail secure (e.g., still locked down when power is removed) the device can include a battery backup system or a secondary spring loaded mechanical latch that stays engages when power is lost. The electric latch version can be designed to be inherently fail secure.

The invention includes a security device for a retail store surface. The security device includes a securing element moveable, relative the retail store surface, from a first position to a second position, and an electromagnetic lock configured to lock the securing element in the first position. The electromagnetic lock can be or include an electromagnet actuated by electric current, and desirably the electromagnetic lock activates a lockdown in the first position. The electromagnetic lock is typically behind the securing element and/or beneath the retail store surface.

In embodiments of this invention, the electromagnetic lock includes a moveable latch configured to move into a lock position relative to a lock element. The lock element can be, for example, a pin or a groove of the moveable securing element.

The invention further includes a method for theft prevention from a retail store surface. The method includes securing a product with a securing element moveable, relative the retail store surface, from a first position to a second position to allow customer access to the product, and locking the securing element in the first position to limit the customer access to the product. The locking can be via an electromagnet and/or an electromagnetic lock.

Embodiments of this invention include a security gate. A security gate according to one embodiment of this invention includes: a latching mechanism, a rigid frame, one or more horizontal hinges, a grate comprising a network of bars or wires sized appropriately to the product on the shelves, and a mounting receiver for mounting to the existing store shelves.

The security gate according to one embodiment of this invention is designed to be used as an anti-sweep theft deterrent by blocking the consumer inventory when closed, but causing the customer to do a deliberate act of opening the security gate and holding it open with one hand, while retrieving the inventory with the other, thus making it difficult to remove many products quickly and easily. A visible flashing or strobe light and/or an audible chime and/or other signaling method is preferably also triggered when the security gate is open, alerting the employees of activity in that department.

The electromagnetic lock can be configured to lock the rigid frame in the first, closed position, rendering the security gate unopenable. The electromagnetic lock can include a mechanical latch on one of the header or the rigid frame and a lock element on an other of the header or the rigid frame.

In embodiments of this invention, a metal plate is attached to the bottom of the electronic product on display using strong adhesive or a mechanical fastener. That plate can serve as the armature or attachment point for an electromagnet. The electromagnet is mounted to the top of the fixture and the device with the plate seats on top of the electromagnet. Several forms of release mechanisms can be used, such as a simple switch to an electronic control system that is RFID card-based or mobile app-based. Using an IP connection, data can be captured and sent to the cloud for potential alerts and monitoring.

Desirably, in embodiments of this invention, the electronic device can be spun around whether locked down or not so shoppers can more easily look at the sides and back of the unit. Embodiments of the invention include an electromagnet, a plate for attaching to the device (preferably round or another configuration that permits a user to spin in place), a structure that ensures separation between the plate and the electromagnet (a pin, a bar, etc.), and a latching mechanism. The device could again be released through RFID (like embedded in an employee badge), a password/key code, a key, or any other suitable means.

In some embodiments, a combination of electromagnet and a pin or heavy aircraft cable (such as with a retractor) can be used to allow some freedom of movement when the electromagnet or electric latch is released, for example to allow the device to be picked up to feel its size and weight, but the pin or cable would still secure the device to the display. This could allow for lighter security during daylight hours where the lockdown latch is released and the tether secures the device, and heavier security at night where the latch is engaged and the product is locked down. The product can also be released by a salesman during a discussion with a customer, but otherwise locked down.

In some embodiments of the invention, an electric latching mechanism is used. The plate adhered to the bottom of the laptop has a stem (e.g., a pin, bar, or other feature) that engages an electronic latching mechanism above or below the fixture surface. The same control and monitoring options are available for this embodiment.

The security device can be operable by the retail user to allow the secured device to move between two device positions, both secured to the display surface: a first position on the display surface (directly or via a device base), and a second lifted or elevated position off the display surface that allows a consumer shopper to better feel the weight of the device for purchasing consideration.

DETAILED DESCRIPTION

Figure 1:
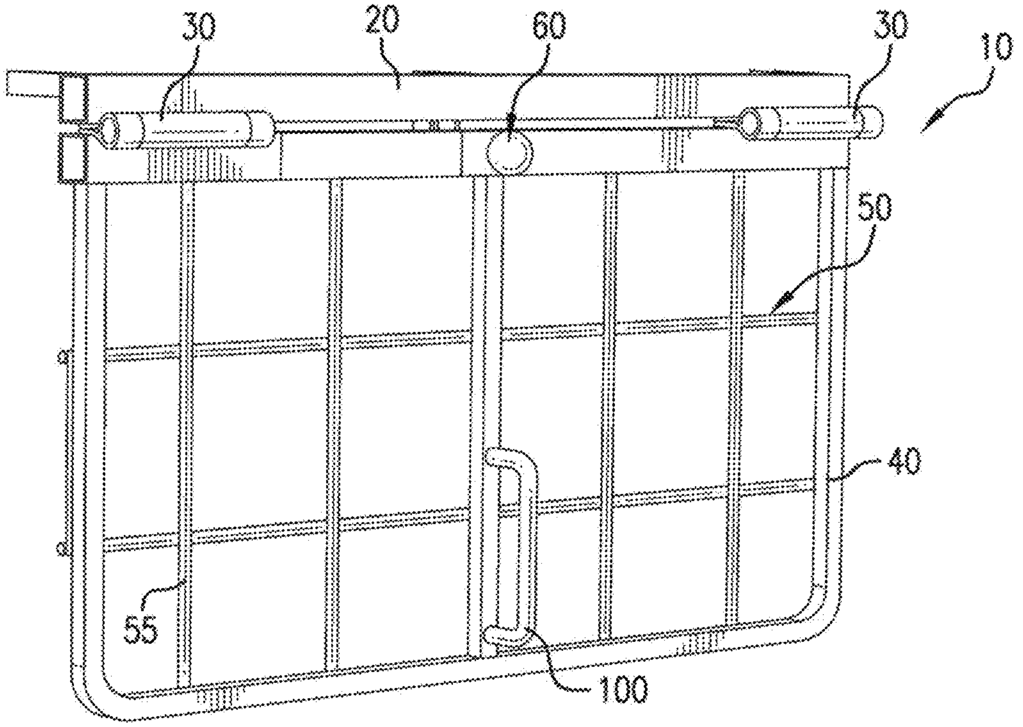
FIG. 1 is a front perspective view of a security gate in a closed position in accordance with one aspect of the subject invention.

A security device for a retail store surface includes a securing element moveable, relative to the retail store surface, from a first position to a second position. An electromagnetic, such as embodied in an electromagnetic lock, is included to lock the securing element in the first position, and keep the element from moving to the second position. The electromagnet or electromagnetic lock can be a primary or secondary security feature. As an example, the electromagnet or electromagnetic lock can be incorporated with an additional security measure as a lockdown device to an otherwise moveable security device, such as a moveable security gate.

A security gate according to a preferred embodiment of the invention is installed onto the leading edge of a shelf or racking typically used in retail environments for holding and displaying consumer products. The security gate preferably covers and blocks one or more products or blocks of products on a shelf or shelving unit.

The products as described are typically high value, high demand products that are easily accumulated and removed if unimpeded. A demand exists to slow the practice of "sweeping" such products from the shelves and quickly exiting a retail store whereupon such products may be resold or returned back to the very store from where they were stolen for a refund or store credit. The term sweeping comes from a sweeping motion of a hand or arm of a thief across a shelf as they quickly dispatch multiple products from a shelf into a cart or other conveyance. Examples of such products which would benefit from such security gates includes power tools, over-the-counter pharmaceuticals, electronic devices, liquor, and other such products although the subject apparatus and system could be used in connection with virtually any product that is displayed for retail purchase.

Mounting methods can vary depending on what type of shelving or racking is used. Remaining components of the security gate are preferably generally uniform across all various mounting receivers. A main swing gate attachable to the mounting receiver is designed to be attached and removed from the receiver for easier installation and scalable flexibility.

As shown in FIGS. 1-20, a security gate 10 according to one embodiment of this invention includes a header 20, at least one hinge 30, a rigid frame 40, and a guard 50. The subject elements are described in more detail below.

As best shown in FIGS. 13-17, a header 20 is preferably mounted to the shelf to provide a support for the remainder of the security gate 10. A mounting receiver 15 in accordance with one aspect of the invention may be fitted with two or more hitch receivers 18 that engage with corresponding forks 24 in the header 20 and/or a rigid frame 40 described below. The header 20 is preferably mounted relative to the mounting receiver 15 that is fixed relative to a store shelving unit. As such, both the header 20 and the mounting receiver 15 are preferably fixed and immovable relative to the shelf. The mounting receiver 15 and/or the header 20 may extend across the entirety of a shelf or for a portion of the shelf depending on the application.

Moving or removing the security gate 10 may be done by loosening pinch bolts and sliding the header 20 out of the mounting receiver 15. The entire remaining security gate 10 assembly can then be walked over to a new section of the fixture and slid into a different mounting receiver 15. Tightening the pinch bolts secures the security gate 10 in place again. Extra mounting receivers 15 can be pre-mounted in the fixture to allow for quick and flexible security gate layouts. Components of the security gate 10 can be customized in different sizes depending on the need. According to one embodiment, the security gate is available in two standard sizes, 22" wide×10.5" tall, and 22" wide×13.5" tall, respectively.

Figure 2:
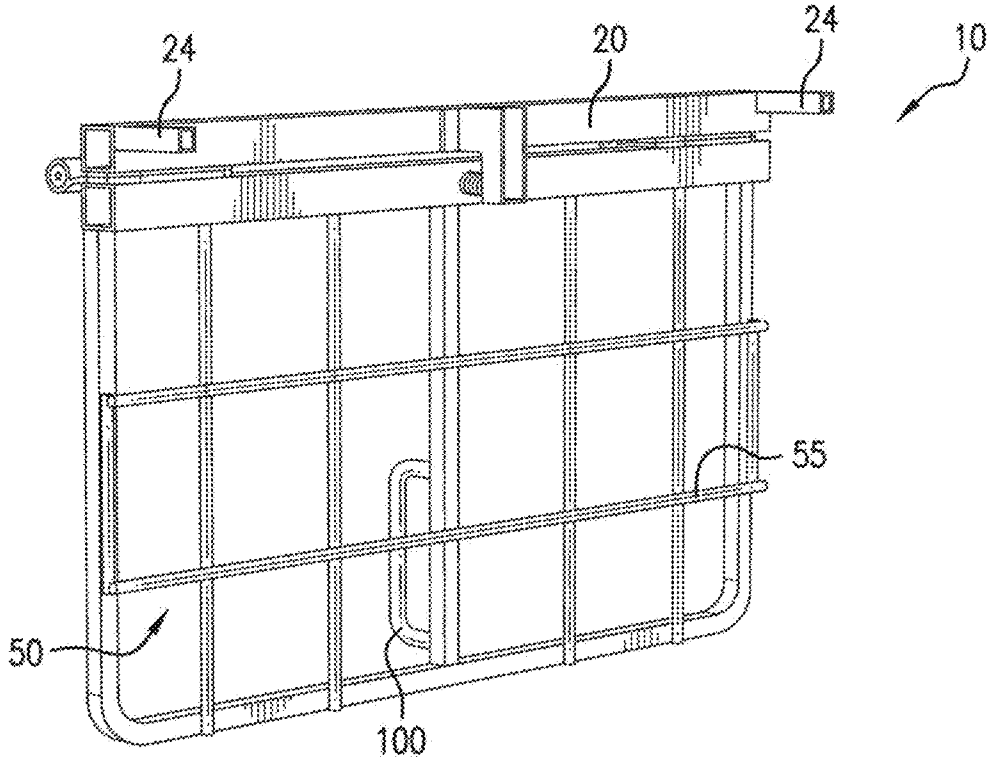
FIG. 2 is a rear perspective view of the security gate shown in FIG. 1.
Figure 3:
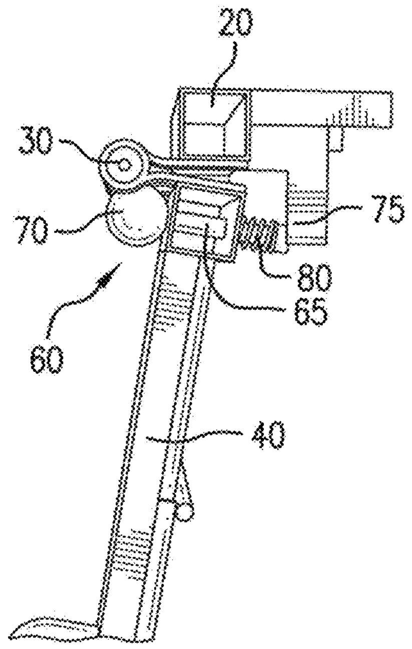
FIG. 3 is a side view of a latching mechanism of the security gate shown in FIG. 1.
Figure 4:
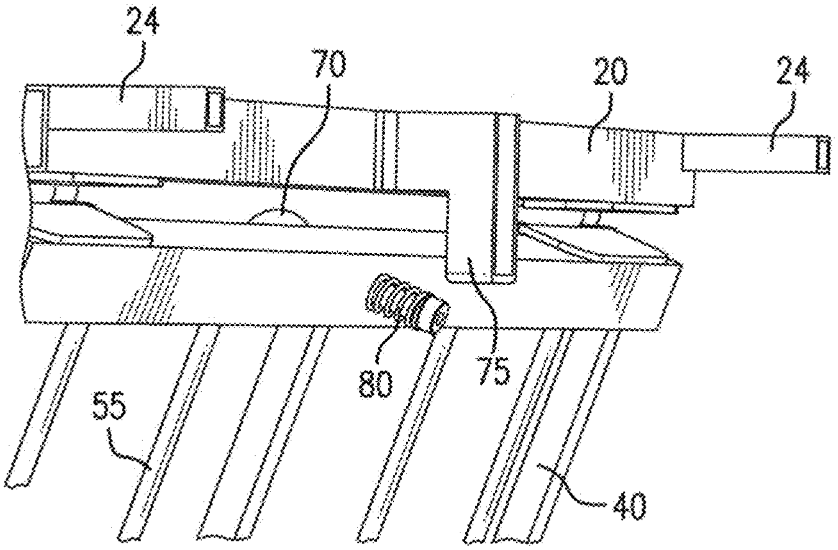
FIG. 4 is a rear perspective view of the latching mechanism shown in FIG. 3.

As shown in FIGS. 1-2, a header 20 is positioned along a shelf and includes at least one hinge 30 arranged in a horizontal alignment with the header 20. The hinge 30 may extend along an entire length of the header 20 or may comprise two or more hinges 30 placed at intervals along the header 20, such as shown in the figures. The hinge 30 may be positioned such that it faces inwardly and is not accessible from outside the security gate 10 or may be positioned outwardly to more easily promote an upward swing of operable components of the security gate 10, such as shown in FIGS. 1-5.

A rigid frame 40 is preferably connected to the header 20 with the at least one hinge 30. The rigid frame 40 thereby is positioned and configured to swing upwardly relative to the header 20 along the hinge or hinges 30. The rigid frame 40 is preferably constructed of a rigid material that maintains a rugged and unbreakable framework along a front of the shelf. In particular, the security gate 10 preferably includes a rigid frame 40 constructed of metal or similar material that is secure and will resist cutting, bending or similar destructive actions.

The rigid frame 40 may span an entirety of the height and width of the shelf or may be strategically sized to span only a portion of the shelf depending on the product to be secured. In fact, it may be possible with a larger product, to include a rigid frame 40 that only spans half or less of the height of the shelf, thereby allowing more unfettered inspection of the product by the customer but still preventing removal from the shelf without opening the security gate 10.

Figure 5:
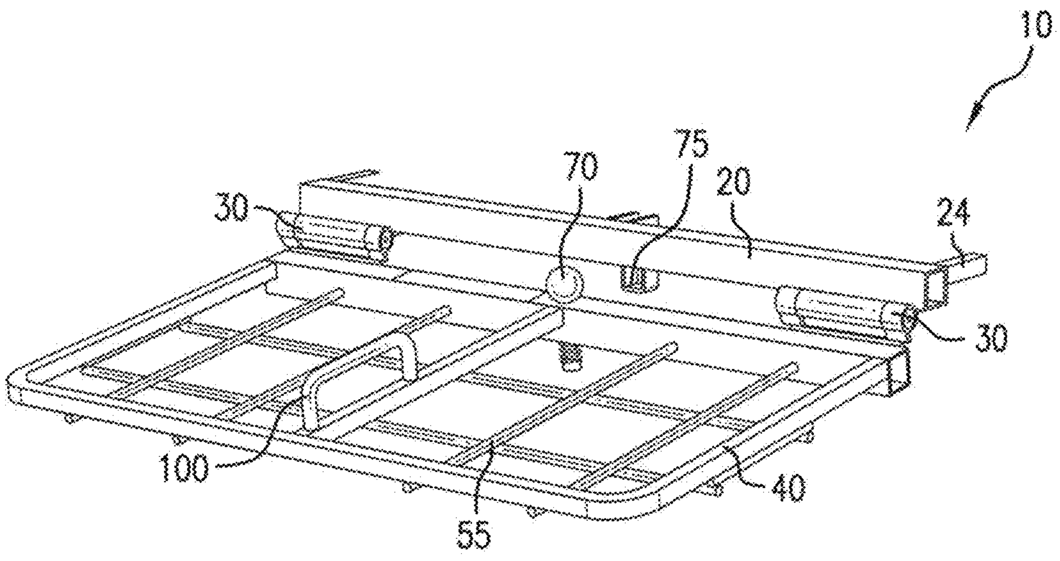
FIG. 5 is a front perspective view of the security gate shown in FIG. 1 in an open position.
Figure 6:
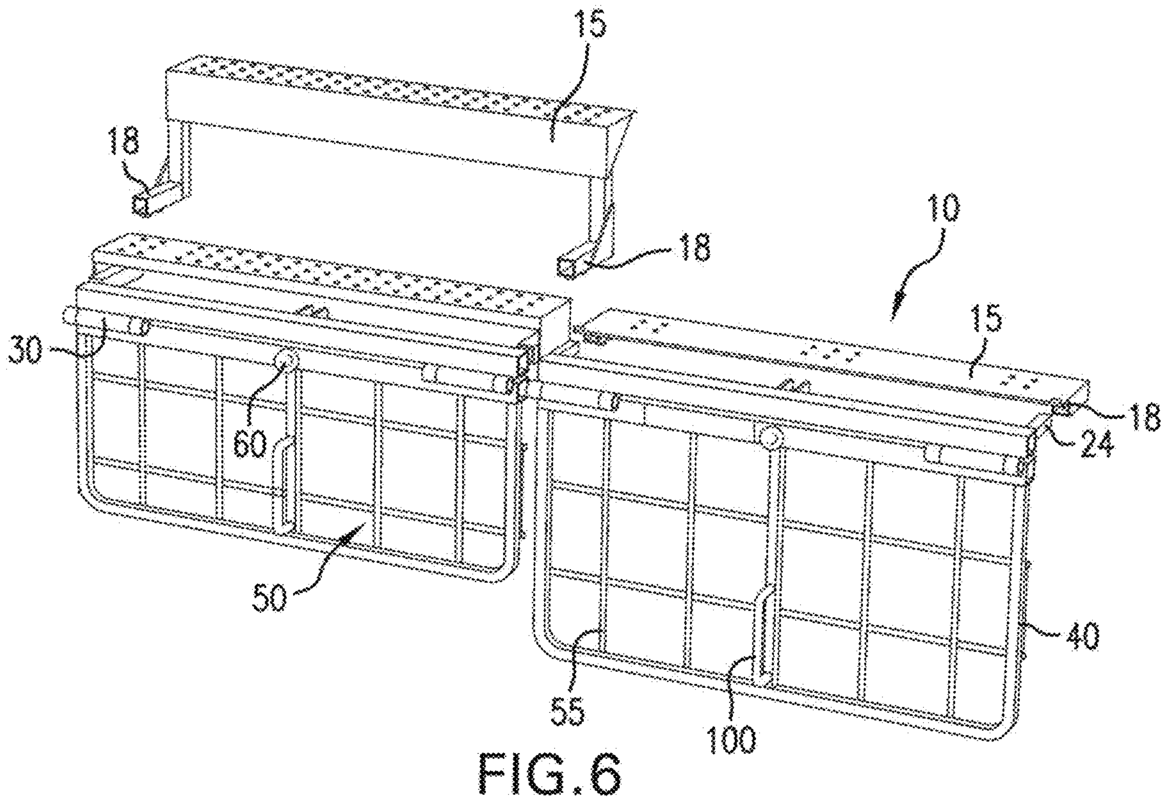
FIG. 6 is a front perspective view of an assembly of security gates in accordance with one aspect of the subject invention.
Figure 7:
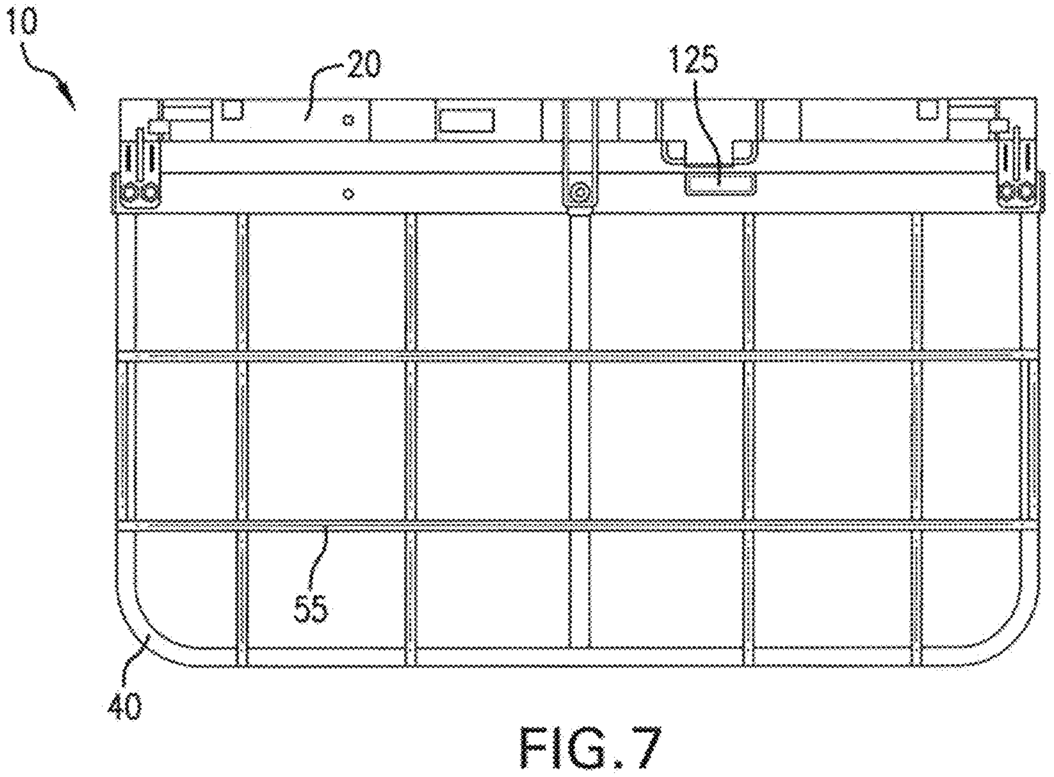
FIG. 7 is a rear view of the security gate shown in FIG. 1.
Figure 8:
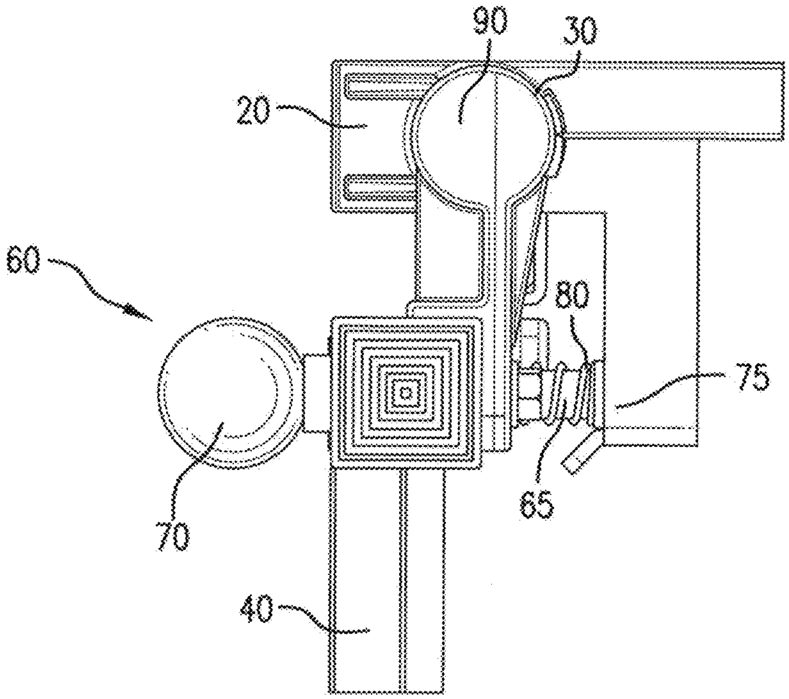
FIG. 8 is a side close-up view of a latching mechanism.
Figure 9:
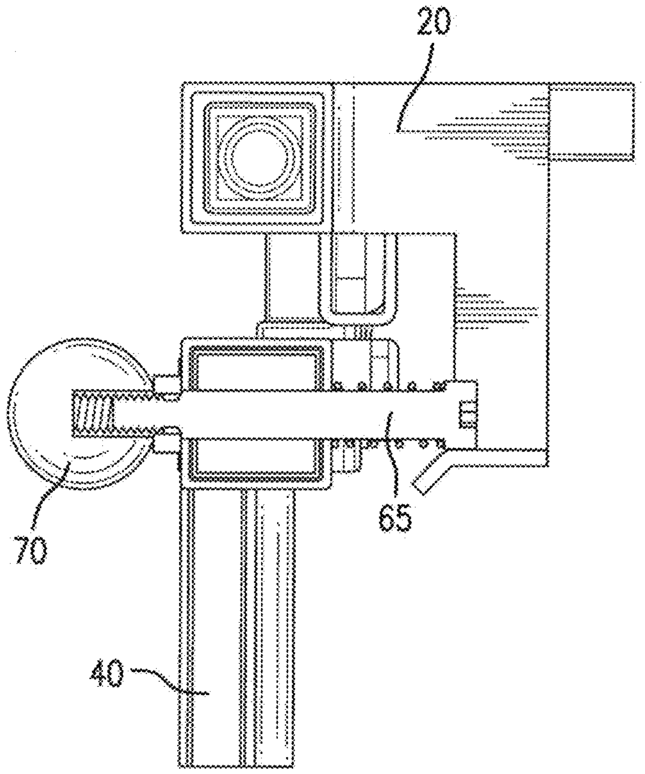
FIG. 9 is a side cutaway view of the latching mechanism shown in FIG. 8.
Figure 10:
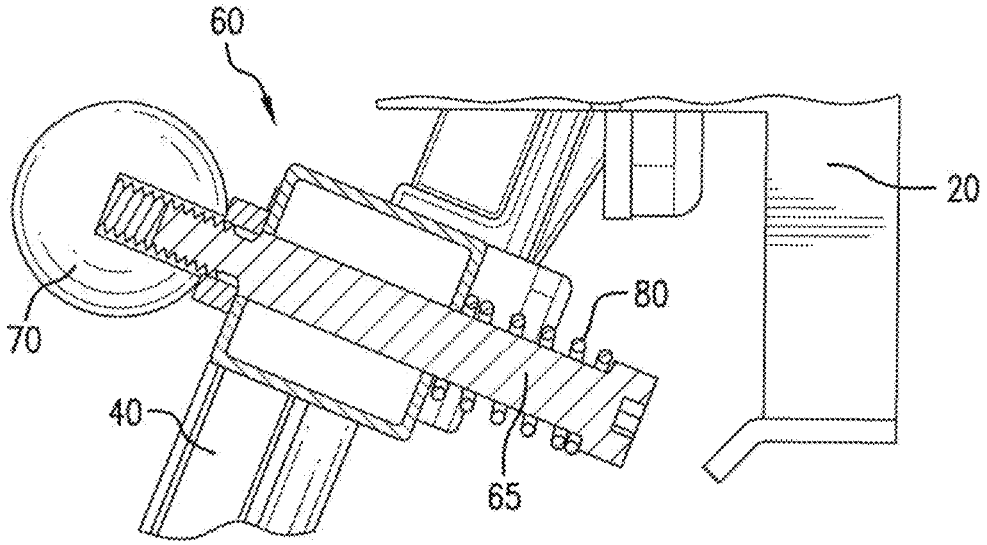
FIG. 10 is a side close-up view of a latching mechanism in a partially open position.
Figure 11:
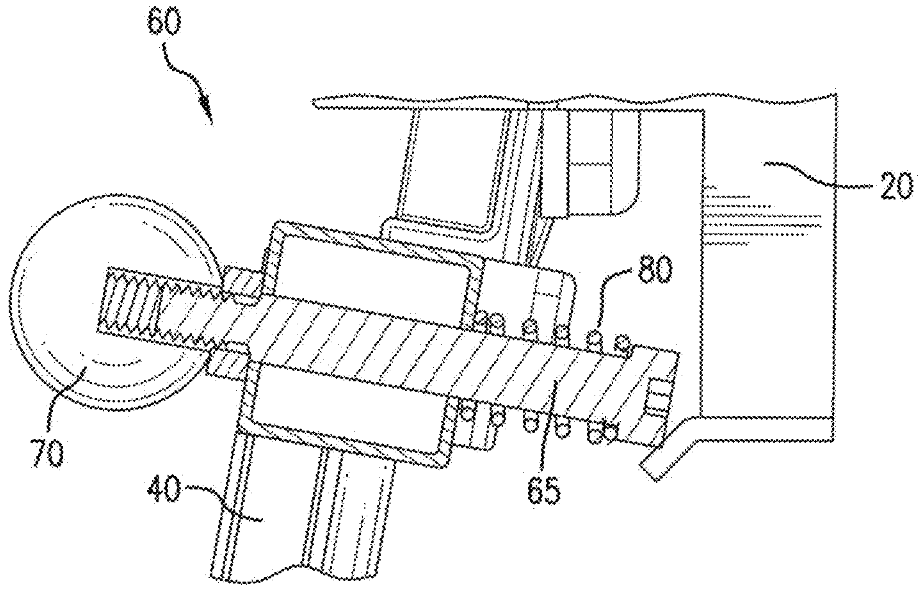
FIG. 11 is a side close-up view of the latching mechanism shown in FIG. 10 in a partially closed position.
Figure 12:
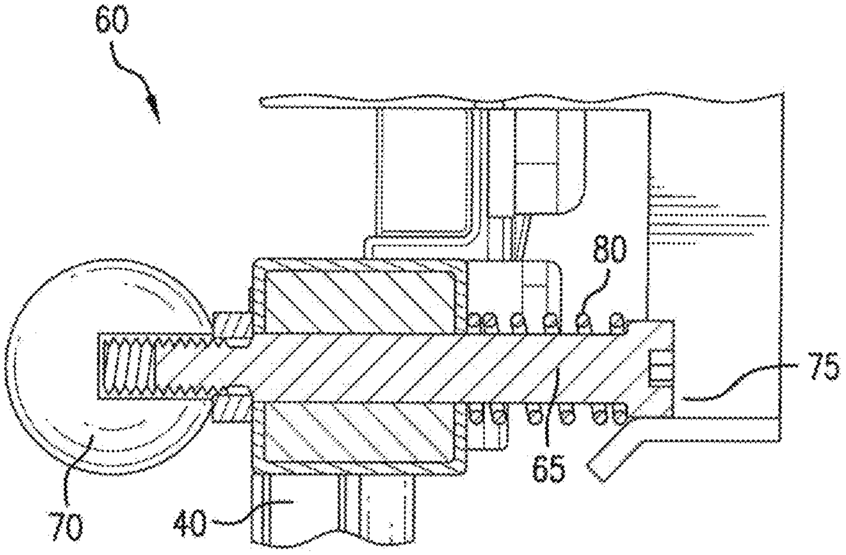
FIG. 12 is a side close-up view of the latching mechanism shown in FIG. 10 in a closed position.
Figure 13:
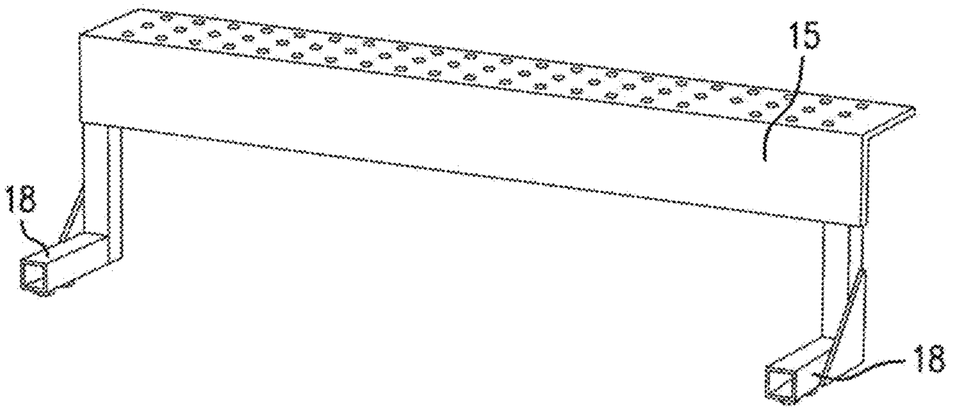
FIG. 13 is a perspective view of a mounting receiver in accordance with one aspect of the subject invention.
Figure 14:
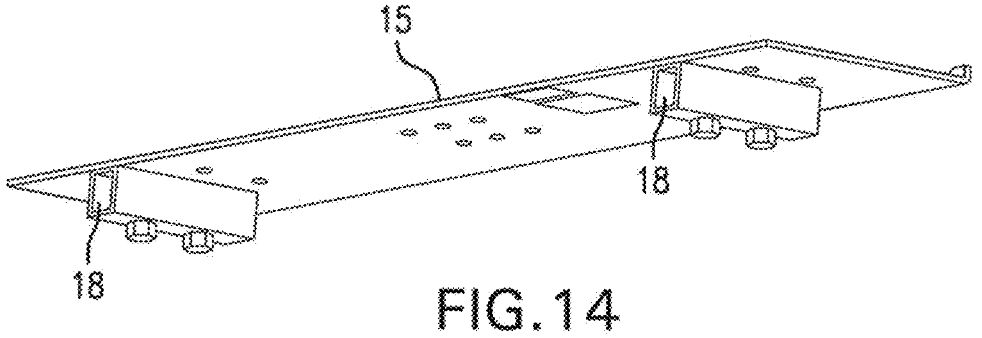
FIG. 14 is a perspective view of a mounting receiver in accordance with one aspect of the subject invention.
Figure 15:
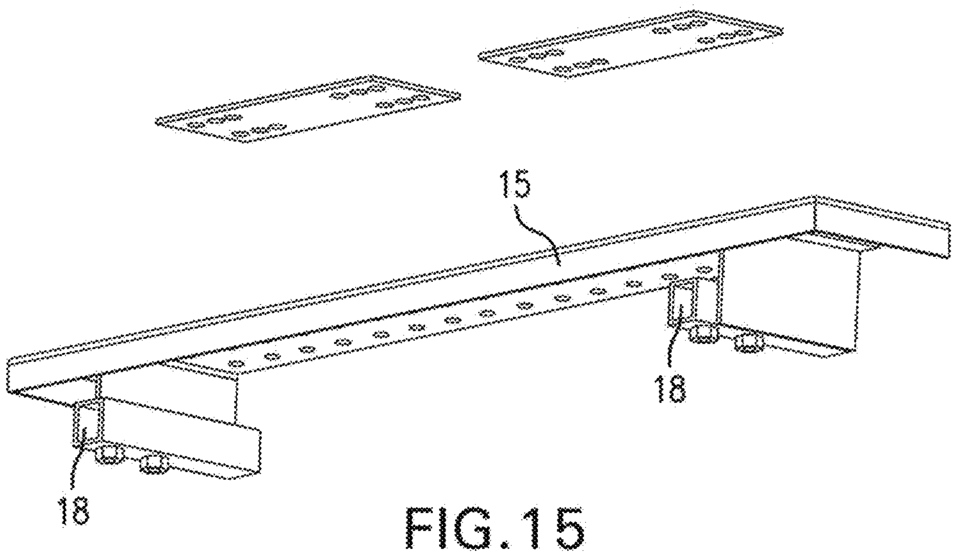
FIG. 15 is a perspective view of a mounting receiver in accordance with one aspect of the subject invention.
Figure 16:
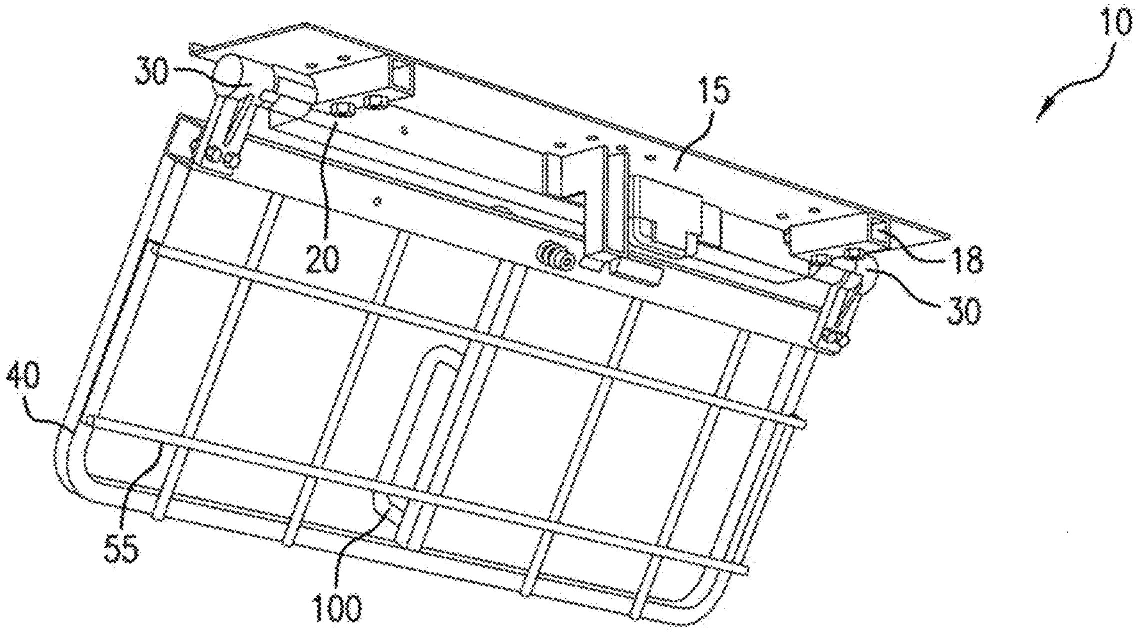
FIG. 16 is a rear perspective view of a mounting receiver and security gate in accordance with one aspect of the subject invention.
Figure 17:
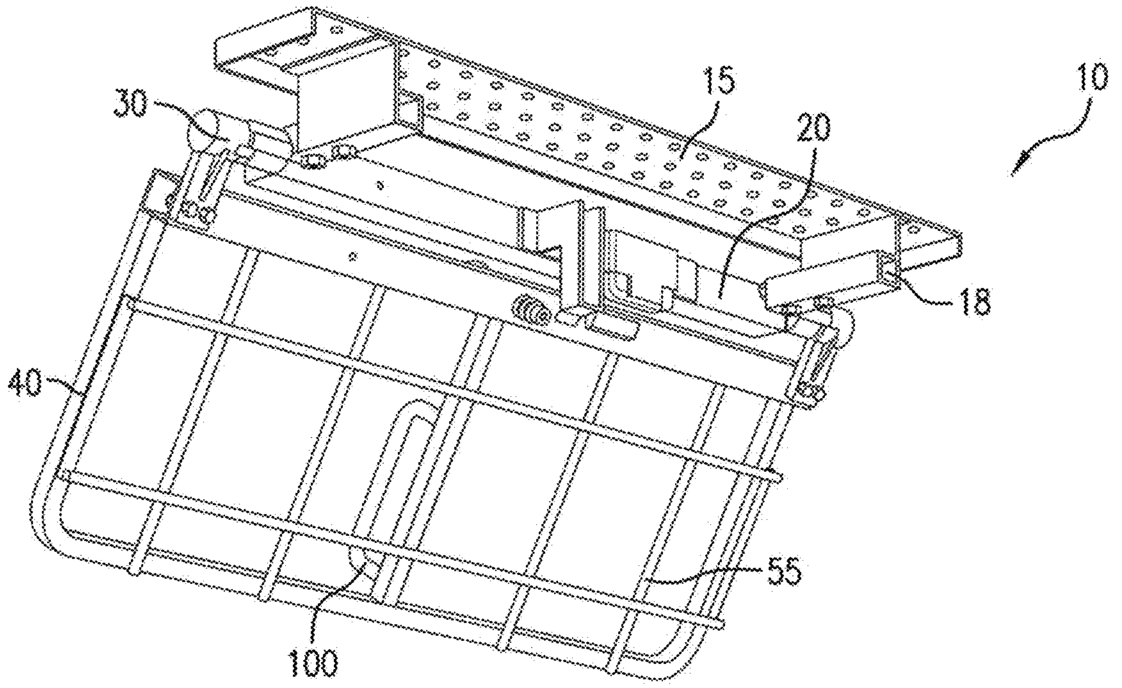
FIG. 17 is a rear perspective view of a mounting receiver and security gate in accordance with one aspect of the subject invention.

A guard 50 is preferably positioned across the rigid frame 40, as shown for example in FIGS. 5-7. The guard 50 prevents a user from removing the products from the shelf while in a latched position generally perpendicular to the shelf. The guard 50 may comprise a network of bars or wires sized appropriately to the product on the shelves that form a grate 55. The guard 50 is preferably mounted across an entirety of the rigid frame and may be sized according to the inventory positioned on the shelves. The grate 55 may comprise a small network of wire, similar to chickenwire, or may instead include a lattice of metal bars that are spaced apart so as to permit generally unencumbered visual access to the inventory on the shelves.

The guard 50 and the rigid frame 40 may be integrated into a single unit or may be welded or otherwise fixedly attached to each other to provide a secure enclosed space on the shelf the prevents products from being removed without unlatching the security gate 10 as described below. The guard 50 may be configured so as to permit a shopper to touch the product through the bars but not permit removal of the product without opening the security gate 10.

Figure 18:
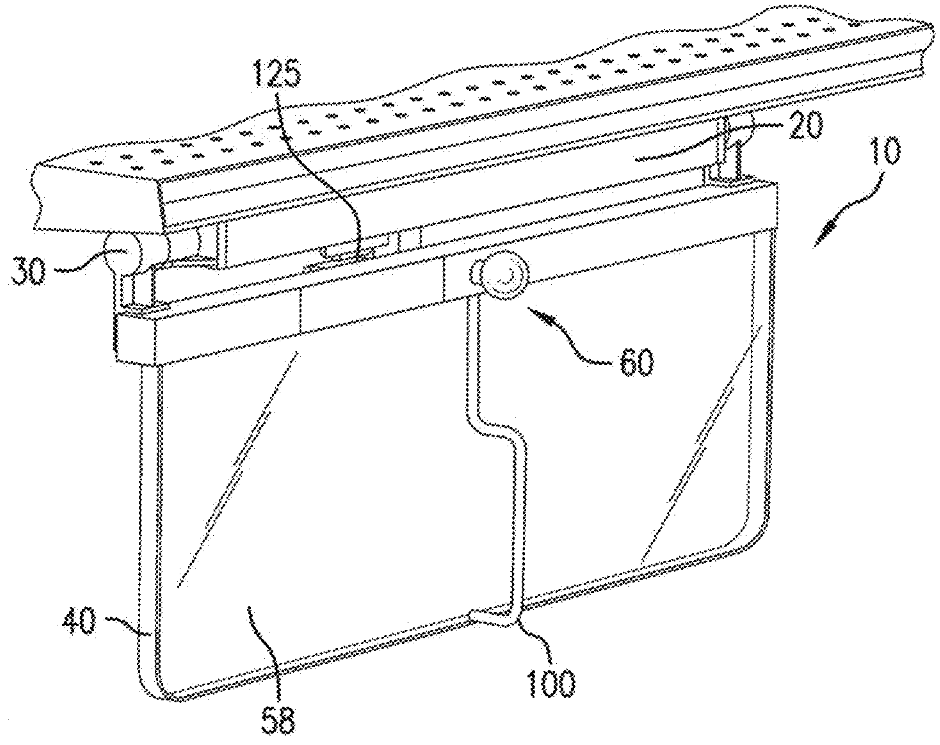
FIG. 18 is a front perspective view of a security gate in a closed position in accordance with one aspect of the subject invention.
Figure 19:
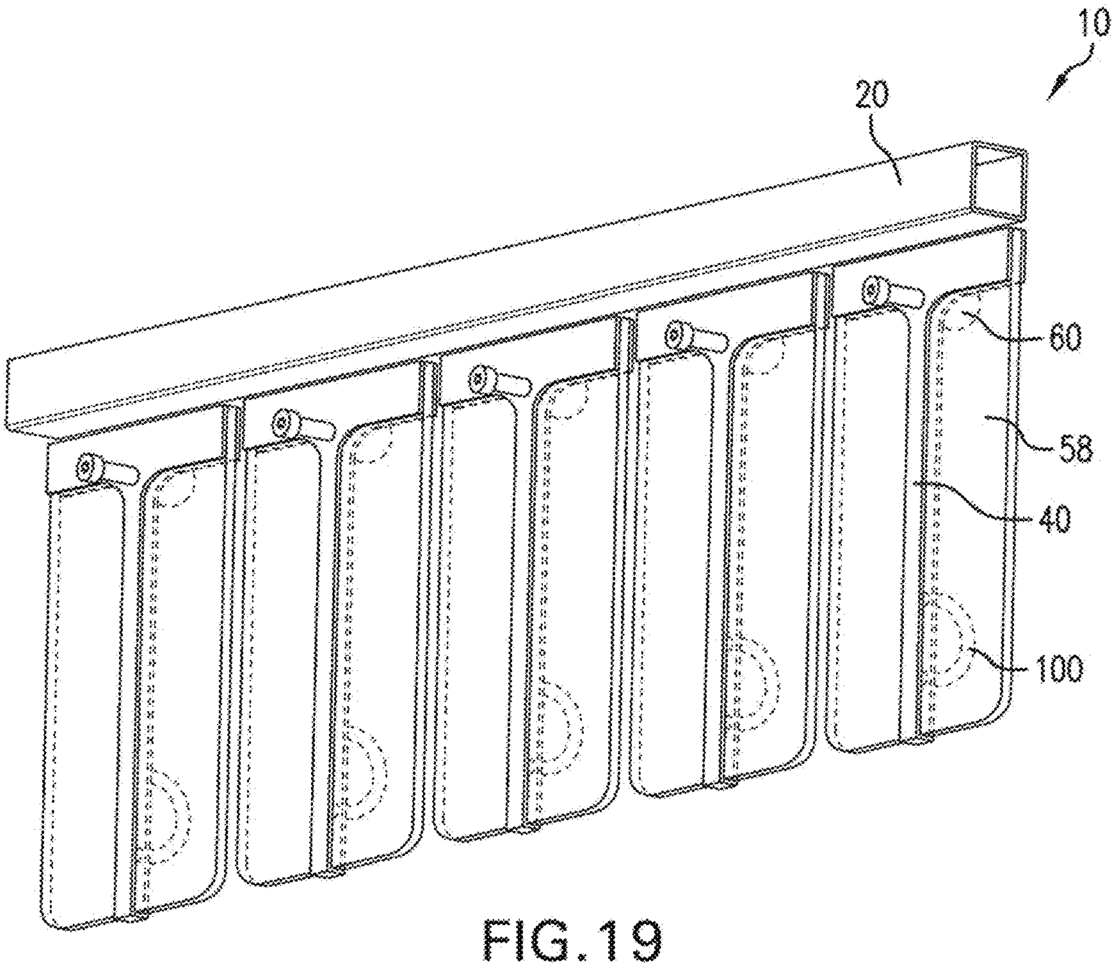
FIG. 19 is a front perspective view of a security gate in a closed position in accordance with one aspect of the subject invention.

According to one preferred embodiment, such as shown in FIGS. 18 and 19, the guard 50 may comprise a transparent shield, such as plexiglass, to permit a shopper to view the products but not permit access to the product without opening the security gate 10. This may be particularly applicable for smaller product or product that is desired for display without any visible obstructions.

As best shown in FIGS. 3, 4 and 8-12, the security gate 10 further includes a latching mechanism 60 connecting the rigid frame 40 to the header 20. The latching mechanism 60 in one preferred embodiment comprises a pin 65 having a knob 70 at an outer end. An engageable detent 75 is preferably located at an opposite end wherein a spring 80 is positioned between the knob 70 and the detent 75 to permit release of the latching mechanism 60. The detent 75 may be positioned on the header 20, as shown in the figures, and/or on the pin 65 of the latching mechanism 60. The pin 65 preferably thereby engages with the header 20 to prevent opening of the security gate 10 without releasing or otherwise influencing the latching mechanism 60.

In part because of the spring 80, the latching mechanism 60 is preferably biased to maintain a latching condition of the security gate 10. Only by positively releasing the latching mechanism 60 may a user raise the rigid frame 40 and guard 50 and gain access to the shelf.

The spring-loaded latching mechanism 60 preferably requires two handed operation to unlatch the latching mechanism as the rigid frame 40 is raised and opened relative to the shelf. In this manner, both hands are required to initiate the opening operation and, once the latch is disengaged, the customer can use that free hand to then hold and remove the inventory as the other hand is required to hold the security gate 10 open (without mechanical assistance).

Once the product is retrieved, the customer can release the security gate 10, and the rigid frame 40 and guard 50 preferably lowers back into position. Once lowered, the weight of the rigid frame 40 and guard 50 will preferably automatically reengage the latching mechanism 60 in a closed position.

According to one preferred embodiment, the security gate 10 may include a damper 90 connected with respect to the hinge 30 to permit at least one of a slowed closing or dampened opening of the rigid frame 40 relative to the header 20. It is preferable that the rigid frame 40 open with no or minimal damping and that, upon release, the rigid frame 40 slowly returns to the latched condition in a dampened manner to avoid slamming the security gate 10 shut and likewise avoid pinching or trapping of fingers and limbs within the device. The damper 90 may be integrated with the hinge 30 or may comprise a separate element positioned relative to the hinge 30, the rigid frame 40 and/or header 20.

As shown in the figures, a pull handle 100 is positioned on the security gate 10 and is separate and distinct from the latching mechanism 60. As shown, the pull handle 100 may be a metal loop or similar configuration that suggests to a user that it is to be pulled to open the security gate 10. By separating the pull handle 100 from the latching mechanism 60, a two-handed operation is required by a user to open the security gate 10 and access the shelf. In this manner, it is difficult for a user to also sweep a shelf or obtain unfettered access to the shelf while in the process of opening the security gate 10. It is preferably that the pull handle 100 is located toward or along a bottom edge of the rigid frame 40 while the latching mechanism 60 is located toward or along a top edge of the rigid frame 40 thereby creating physical separation between the two. As such, the pull handle 100 is located at an opposite edge of the guard as the latching mechanism 60.

The security gate 10 for a retail store shelf displaying one or more products is preferably retrofittable across a range of shelf styles and configurations. As shown in FIGS. 6 and 13-17 header 20 is preferably attached to the shelf using a mounting receiver 15 or bracket. Such mounting receivers or brackets are preferably an interchangeable and customizable component dependent on existing store shelving.

Figure 20:
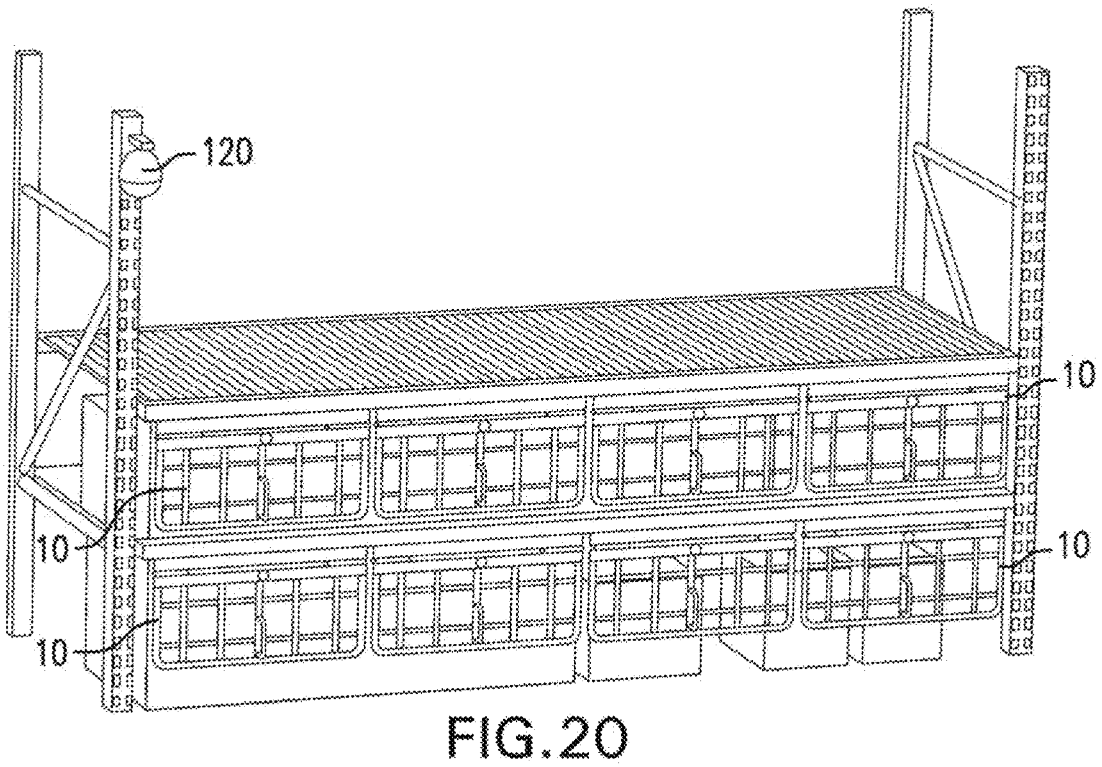
FIG. 20 is a front perspective view of a shelf fixture having a plurality of security gates in a closed position in accordance with one aspect of the subject invention.
Figure 21:
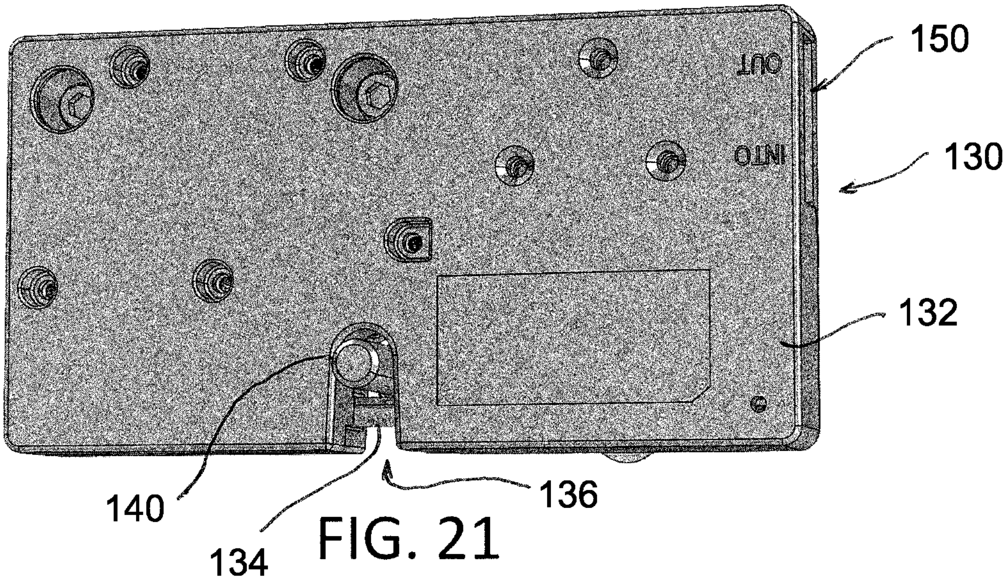
FIGS. 21 and 22 illustrate a security device in a closed position, according to one embodiment of this invention.
Figure 22:
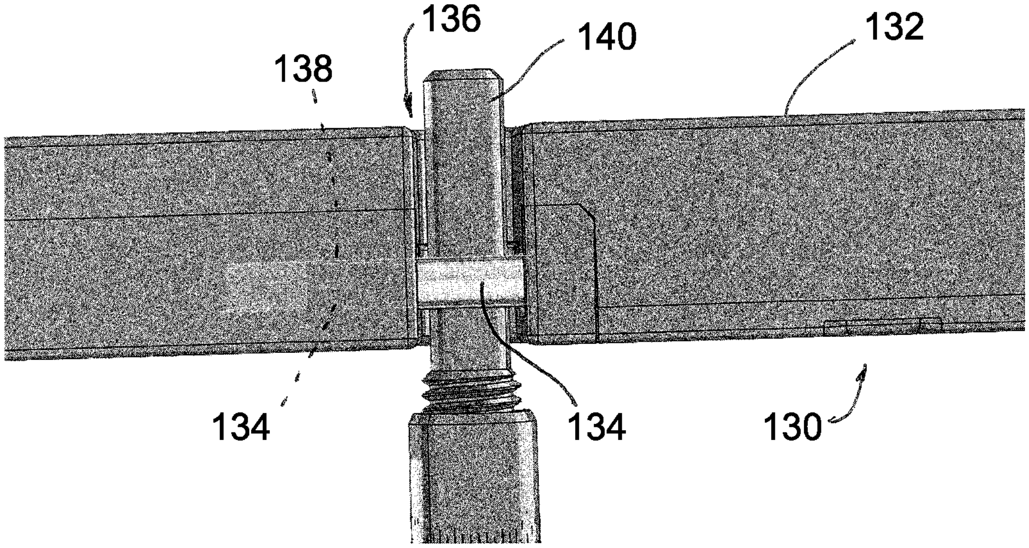
Figure 23:
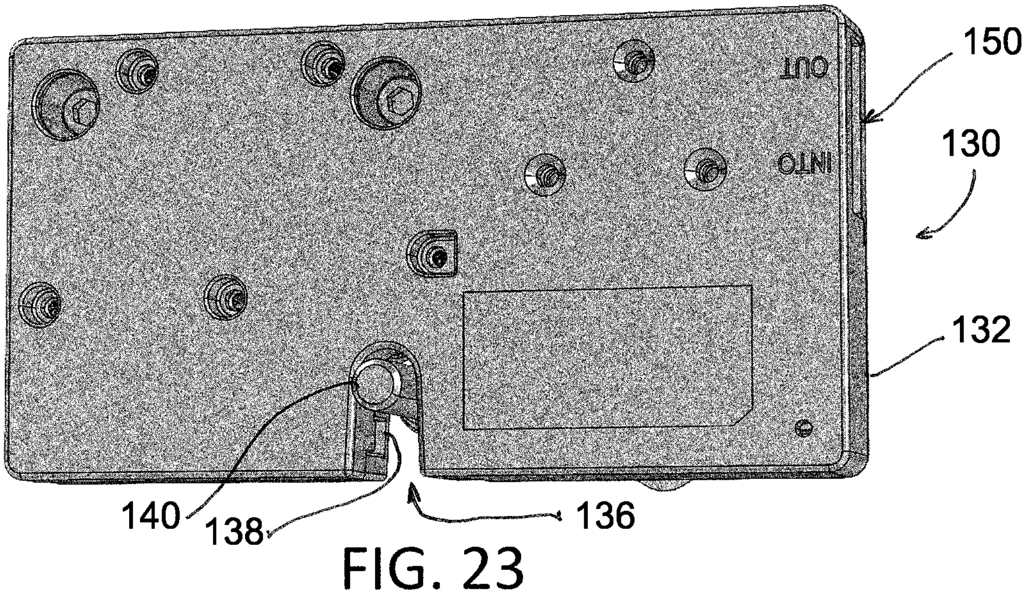
FIGS. 23 and 24 illustrate the security device of FIGS. 21 and 22 in an open, unlatched position.
Figure 24:
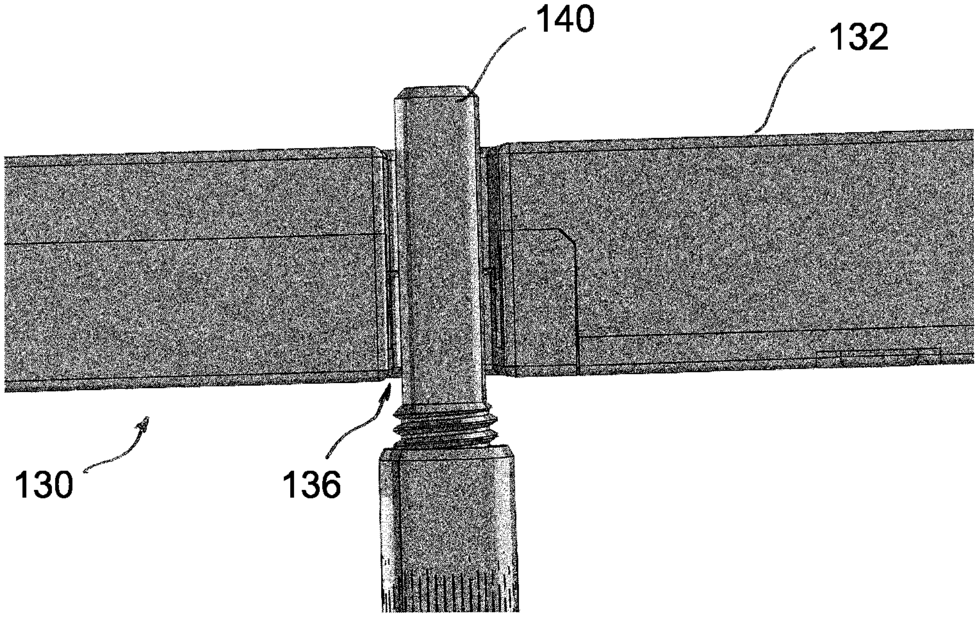

The security gate 10 may include a rigid frame 10 for each header 20, such as shown in FIGS. 1-6, or may include a plurality of rigid frames 40 and latching mechanisms 60 on each header 20, such as shown in FIG. 19 connected. FIG. 20 shows an entire store shelving unit having multiple security gates 10 as contemplated by this invention. As shown in FIG. 20, the security gates 10 may be used on raised shelves or on the ground relative to a shelf above, thereby leveraging a store floor as an additional display surface while still maintaining security of the displayed product.

According to a preferred embodiment of this invention, an alarm 120 may sound when the security gate 10 is in an open position. The alarm 120 may comprise a visual light or strobe and/or an audible chime or noise that alerts area store personnel to the opening of the security gate 10, such as shown in FIG. 20. The alarm 120 may alternatively or in addition comprise a public address announcement throughout the store. In addition, store personnel may receive some indicator or message to an individual electronic device on their person. As shown in FIG. 7, sensors and/or contacts 125 may be positioned within the hinge 30 or between adjacent portions of the security gate 10 such as between the rigid frame 40 and the header 20 that trigger the alarm to be conveyed. Alternatively, contactless, wireless sensors or other types of sensors may be used to generate an alarm.

These sensors 125 may then transmit a condition to the alarm 120 to provide the notifications described above. The alarm 120 may therefore be activated when the sensor 125 determines that an alarming condition is met. The alarming condition may include at least one of: (1) release of the latching mechanism 60 one time; (2) release of the latching mechanism 60 X times, where X can be a reasonable number of unlatching actions as a sum total or a number of unlatching actions within a certain time; and/or (3) a time delta t between when the latching mechanism 60 is released and relatched. For instance, if a customer unlatches the latching mechanism 60 and does not release it for 60 seconds, a certain alarm 120 may be activated generally or directly to store personnel.

The above described alarm formats may change or escalate based upon alarming condition of the security gate 10. For instance, a format of the alarm may change from a blinking strobe to an audible alarm based on a number of security gates 10 that are open simultaneously in one shelving unit or throughout the store.

As described above, according to one preferred embodiment of this invention, an alarm and a visual strobe activates when a gate is open. In another preferred embodiment, when multiple (Z) gates are opened within a particular time period (t), then a second alarm sounds, preferably with a different sound, volume and/or message from the first alarm. For example, when one security gate 10 is opened, a doorbell chime may sound and the strobe may blink slowly. If three gates are opened within 15 seconds, an ambulance siren may sound and the strobe may blink faster, brighter and/or in a different color.

The security gate may be further connected with respect to an Ethernet and/or wireless connection within a retail environment to enable real time notification of store personnel when a single security gate is opened and/or opened X times and/or Z gates within a t time period. Such notifications may advise store personnel of the condition (Z gates) and/or the store location where the condition was observed.

In addition, an IoT enabled central control/computer processor may connects to a wireless receiver and captures gate open/close events and sensor status. The processor may store and send gate sensor activity and data to local or remote IP server endpoints. In addition, the processor may trigger local visual and audible alerts such as a strobe and chime. In addition, or alternatively, the processor may text alerts, email alerts, and other real time reporting based on gate events such as multiple security gates 10 opened quickly, security gates 10 left open, etc. Historic security gate 10 sensor 125 activity/status data may be stored in local and remote databases for post analytics processing and reporting.

In one preferred embodiment, each security gate 10 includes sensors 125 that each have a unique numeric ID which is sent to the central control/computer processor with each message/alert. These sensor IDs can be learned by the central processor to: filter out any ambient wireless data so we only act on our sensors; allow specific gate "plan-o-gram" identification to log which gate is open and where in the store (for larger installations); and/or allow other logic such as triggering events when a specific gate is left open too long or if multiple gates are all opened quickly. A store or central control may "learn" sensors to the system either by uploading a table of sensor IDs to the central control, or by activating a sensor (opening and closing a gate) several times within a short duration which will "auto learn" the sensor. This ensures that messages coming from nearby security systems that use the same kind of sensors will not become part of the central control system and cause false triggers. All data from these sensors can also be sent to a cloud server database and analytics can be reported on all the gate activity.

An audible and/or visual alert may be triggered locally when gates are opened, but this behavior may be programmable. For example, a doorbell chime sound may be triggered when a gate is open, but if 3 gates are opened within 15 seconds, a different siren sound may be triggered, such as described above. The sounds may be customizable using .WAV files over a pair of standard USB powered speakers. These sounds could also be voice prompts and/or public address announcements such as "customer needs assistance in the tool aisle," etc. A chime or other sound may be triggered if a security gate has been left opened for more than a predetermined time period t, for instance 80 minutes. This "left open" alert may be a third alarm different from the first alarm and/or the second alarm.

A related method for theft prevention from a retail store shelf including a security gate 10 includes providing a header 20 along a top of the shelf; providing at least one hinge 30 arranged along the header 20; providing a rigid frame 40 on the header 20 with the at least one hinge 30; positioning a guard 50 across the rigid frame, the guard 50 preventing a user from removing the products; and providing a latching mechanism connecting the rigid frame to the header 20. It is preferable in such a method that the security gate 10 requires two hands to open, one hand to release the latching mechanism and the other to pull the rigid frame open relative to the header.

Figure 25:
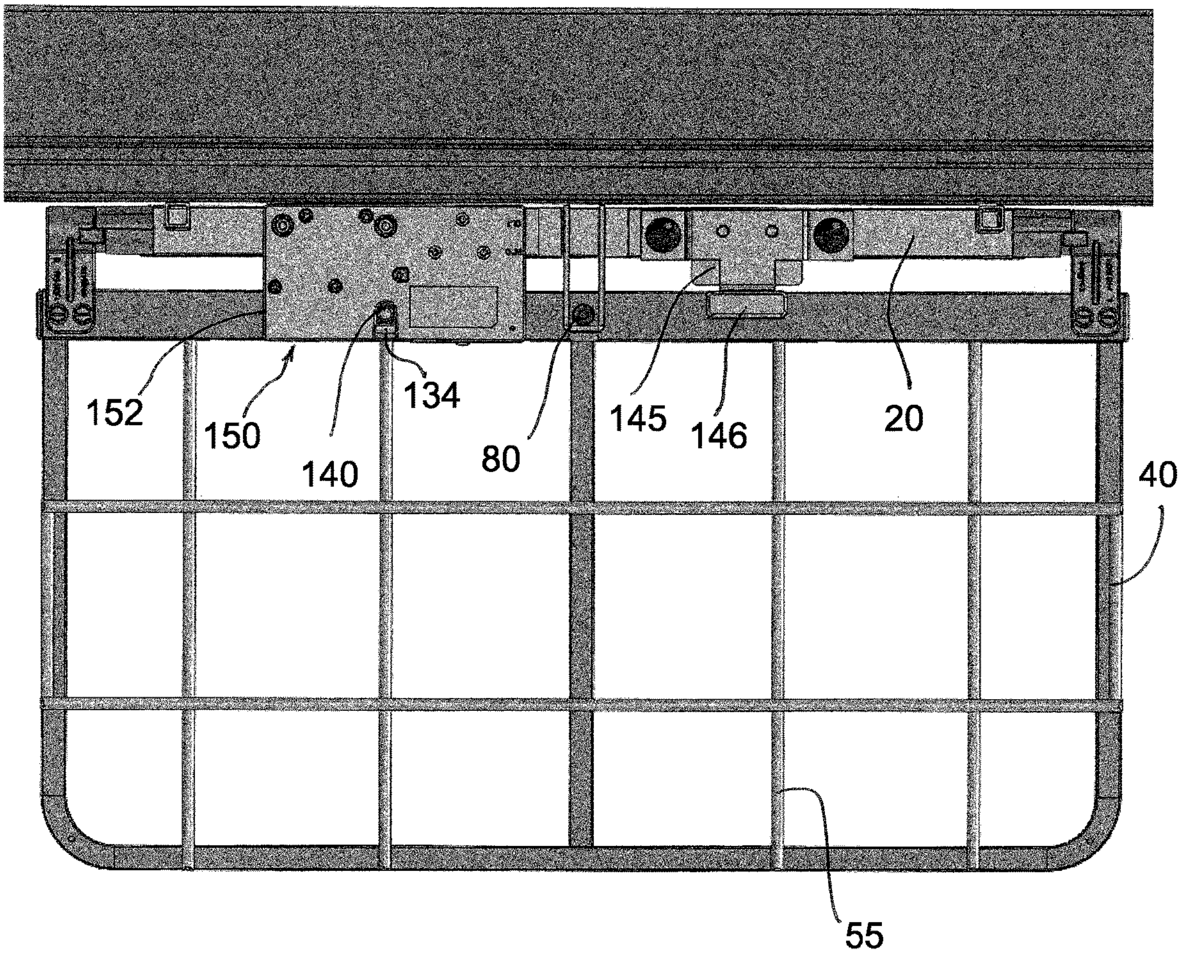
FIGS. 25-27 each show an implementation of the security device of FIG. 21 with a security gate, according to embodiments of this invention.
Figure 26:
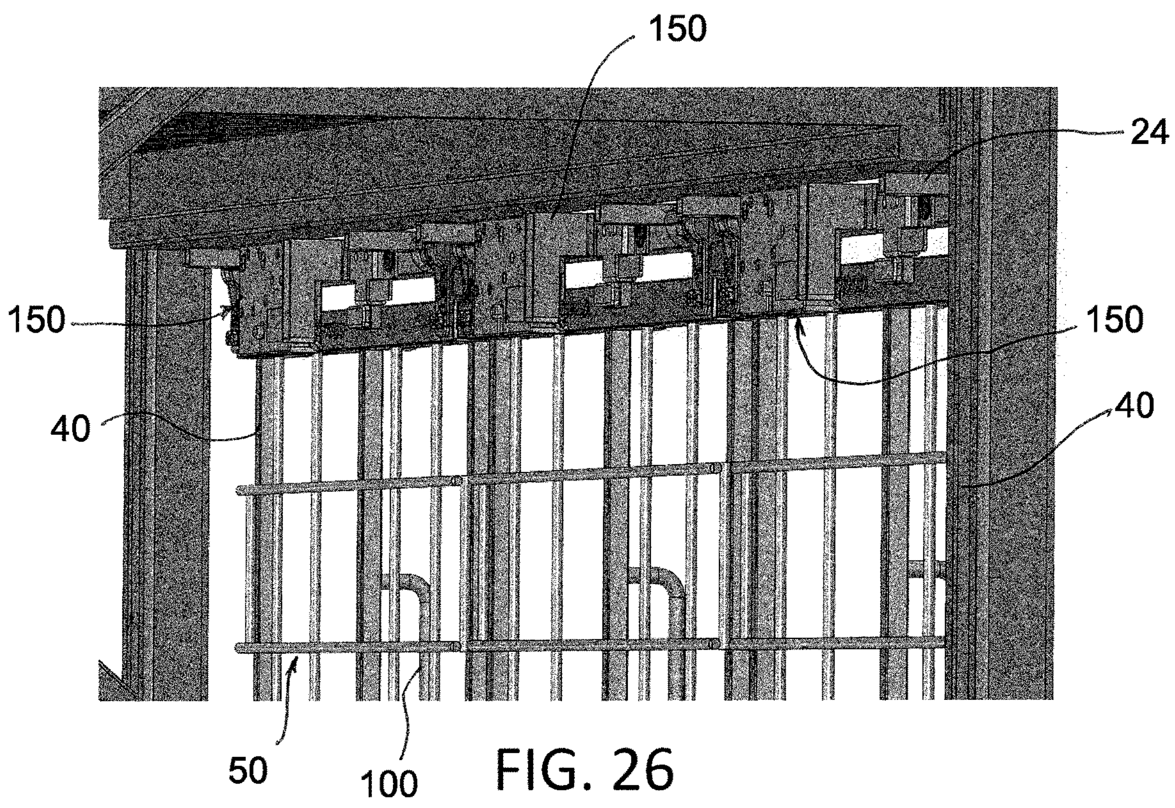
Figure 27:
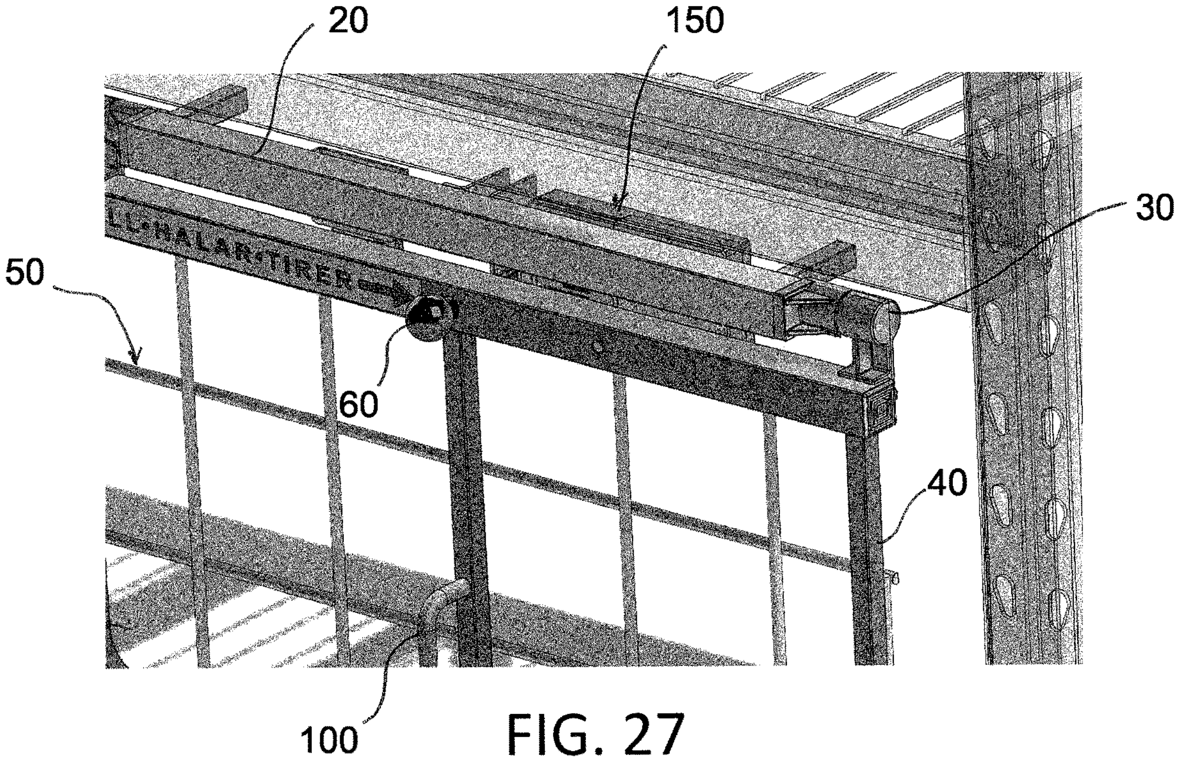

FIGS. 21-27 illustrate an exemplary security device 130 including electromagnetic lock configured to lock a security gate, such as described above, in a lockdown position, such that the security gate cannot be lifted to access the products. The security device 130 includes a housing 132 that is connected, such as by bolts or equivalent, to a fixed part of the security gate, such as to the header 20 as shown in FIGS. 25-27. The housing 132 encloses an electromagnetic lock, actuatable to move latch bolt 134 across/through slot 136 into an opposite receiver opening 13 to secure pin 140.

Pin 140 is attached to the frame 40 of the gate, as shown in FIGS. 25-27. When latched, the pin 140 cannot tilt from the slot 136, and the security gate cannot be opened. Pin 140 can be attached to the frame 40 by any suitable means, such as threaded into a threaded receiver, or welded thereon. As will be appreciated, various sizes, shapes, placements, and configurations are available for the device, electromagnetic lock/latch, and lock element/pin. As an example, the housing and pin can be reversed, such that the pin is on the header, and the latch is on the moveable frame. The pin can also include an opening through which the latch extends, which can also be useful for gates that open differently, such as like a door using side hinges. The latch can also extend toward the frame, and into a groove opening in the frame. The lockdown security device can also be implemented from any side of the frame, with the header attachment being preferred for installations as discussed above. The latch can include various sizes, shapes, and configurations, depending on need, such as a hook against a surface or other known latch style.

In embodiments of this invention, the security device includes a sensor 145 that determines that the gate is closed and the pin 140 is properly within the slot 136. The sensor 145 is shown as attached to the header 20, with a secondary sensor element 146 on the frame 40. The latch 134 will not close if the element 146 is not in correct position with the sensor 145.

The security device 130 is electrically powered, such as by wired connection via electric and/or data port 150. The security device of embodiments of this invention can also be battery powered, either as a primary power source or a backup power source. The security device can be used standalone or in series with other like security devices, such as shown in FIG. 26, connected through the input and output connections of port 150. A controller can be used to actuate and deactivate the security device. The controller can be a remote, centralized control system, and/or integrated within the housing 132. The controller desirably can be activated locally by an employee, such as using a RFID card, mobile application, or equivalent activation key/device.

Embodiments of the invention further provide a security device and a method for securing and/or aligning a mobile electronic product (e.g., a laptop computer) to a fixture (e.g., a display surface). The invention provides a lockdown position, such as holding the device tight to the display (e.g., directly or on a base), and a released viewing position. The lockdown position can be provided through use of an electromagnet or an electromagnetic lock. In embodiments of this invention, a metal plate is attached to the displayed products, and an electromagnet is attached to, or otherwise integrated into, the display surface. The electromagnet can be released by retail employees as needed for customer review.

A security device according to a preferred embodiment of the invention is installed on and optionally through a display surface, such as a table or other display cabinet. A base is attached to a display side of the display surface on which the displayed electronic product is to be disposed. A locking mechanism is attached to an underside of the display surface, opposite the base. A movable connector extends through the base and display surface and is lockable by the locking mechanism. The movable connector is attached to the electronic device and allows the electronic device to be lifted above the base and display surface, allowing the potential purchaser to better feel the weight of the electronic product. In embodiments of this invention, the connector can be locked against lifting in a position against the base to further enhance security. The connector can be released by the retail operator to allow lifting movement.

Figure 28:
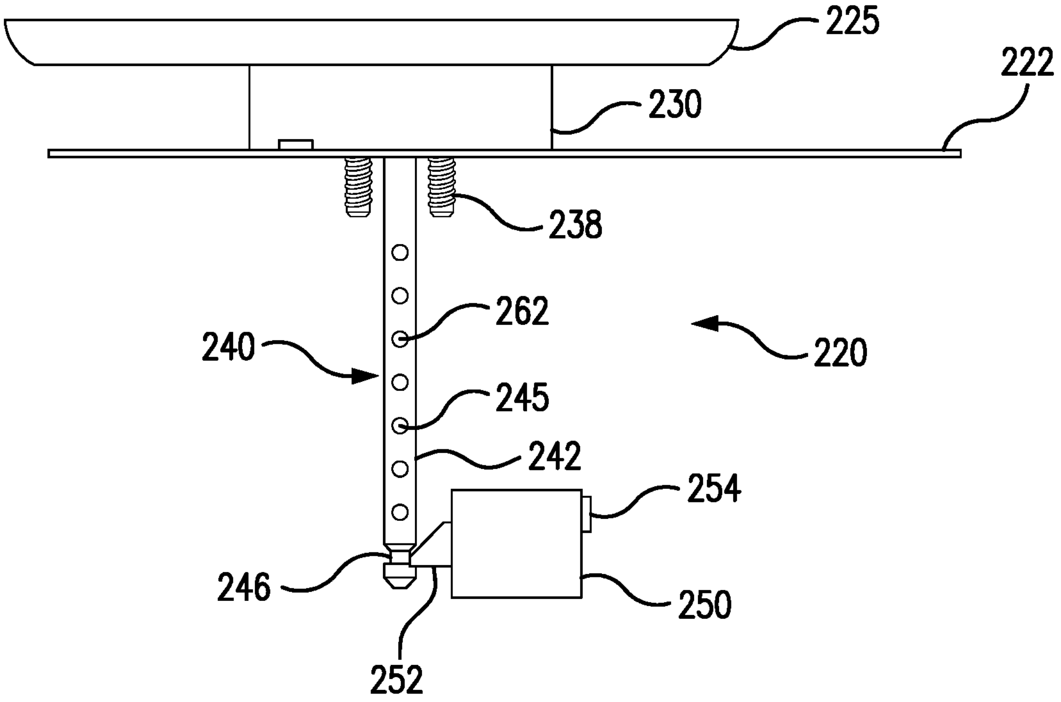
FIG. 28 shows a security device according to one embodiment of the invention.
Figure 29:
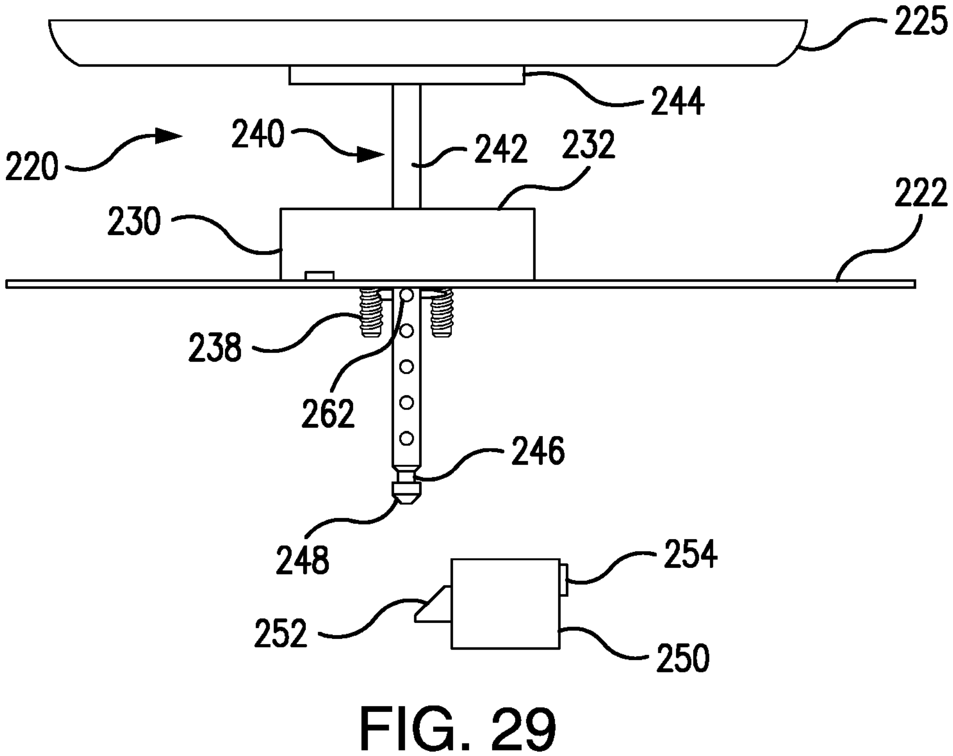
FIG. 29 shows the security device of FIG. 28 in a second, lifted position.
Figure 30:
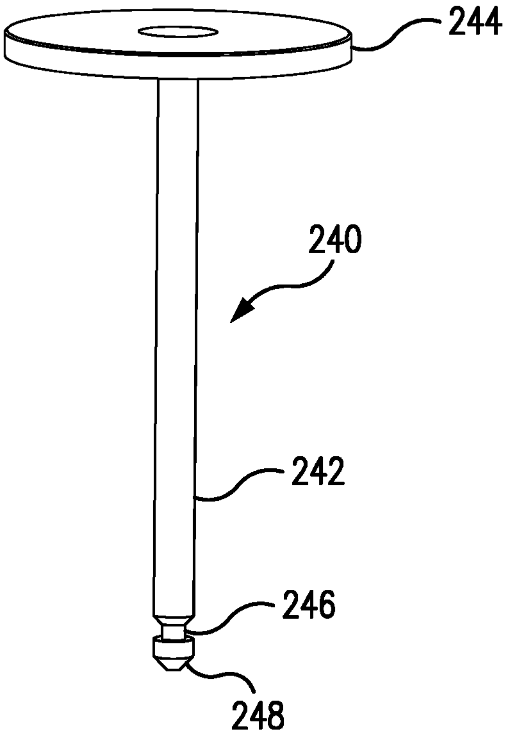
FIGS. 30 and 31 each show components of the security device of FIGS. 28 and 29.
Figure 31:
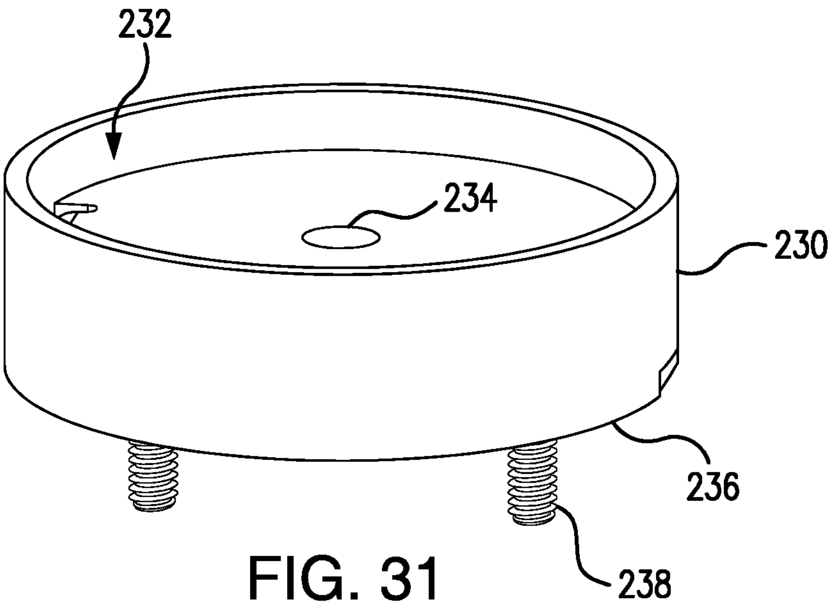

FIGS. 28 and 29 show a security device 220 on a retail display surface 222 and attached to an electronic product 225, according to one embodiment of this invention. FIGS. 30 and 31 show a base 230 and connector 240, respectively, of the security device 220 in FIGS. 28 and 29.

Referring to FIG. 31, the base 230 includes a recessed 2 seat 32 for receiving the connector 240. The recessed seat 232 is shown as circular to allow the circular connector 240 displayed product 225 to rotate within the seat 232 for viewing. The recessed seat 232 can alternatively include any known shape or element to assist in aligning the connector 240 to and displayed product 225 in a desired display orientation. The recessed seat includes an opening 234 that allows a portion of the connector 240 to extend through the base 230 Opposite the top-side recessed seat 232 is a base bottom surface 236 that sets on the display surface. The bottom surface includes attachment elements 238 for attaching to the display surface 222, shown in FIGS. 28-29 as threaded bolts that extend through the display surface 222 to receive a corresponding nut or equivalent.

Embodiments of this invention can be implemented without the base element. The opening for the connector can be simply provided in the display surface. A recessed seat can also optionally be formed in the display surface.

Referring to FIG. 30, the connector 240 includes a stem 242 sized and shaped to extend through the base opening 234. The connector 240 includes an attachment head 244 at a first (top) end of the stem 242, for connection to the displayed electronic product 225. The stem includes a groove 246 at a second, opposite end 248. The groove 246 is adapted to receive a latch bolt of a locking mechanism, such as shown in FIG. 28. In FIG. 30, the stem 242, groove 246, seat 232, and opening 234 are all circular to allow rotation within the seat 232. As will be appreciated by those skilled in the art, various and alternative sizes, shapes, and configurations are available for these elements depending on need, such as to allow limited/partial rotation, for example in a range of only 90-180° about the opening.

FIG. 28 shows the security device 220 with the connector 240 in a first position on the base 230. The connector head 244 is attached to product 225, such as by adhesive and/or mechanical fastener, and within the recessed seat 232. The product 225 sits on the base 230 for display. The connector 240 is locked in this position by locking device 250, which includes a moveable latch bolt 252 extending into the groove 46 which limits any vertical movement of the stem 242 within the base opening 234.

Figure 41:
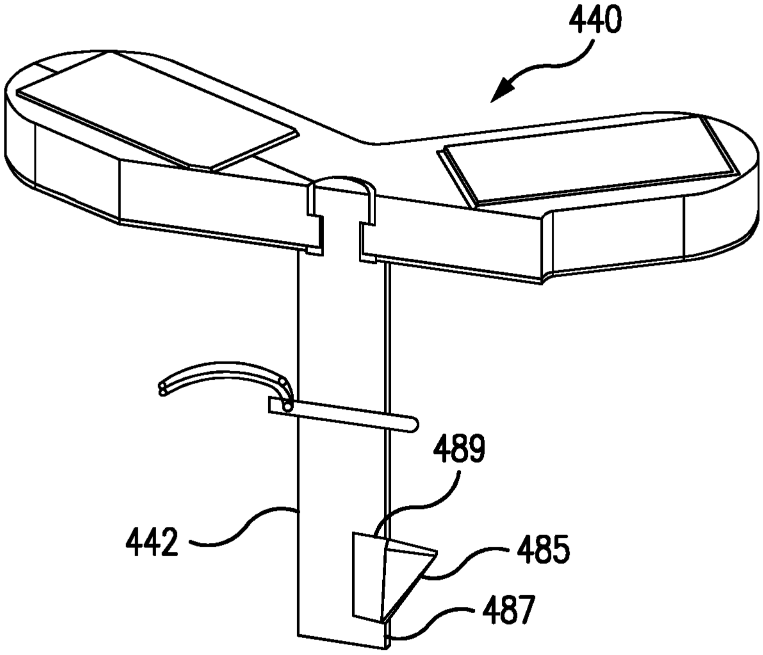
FIG. 41 shows a security device connector according to one embodiment of this invention.
Figure 42:
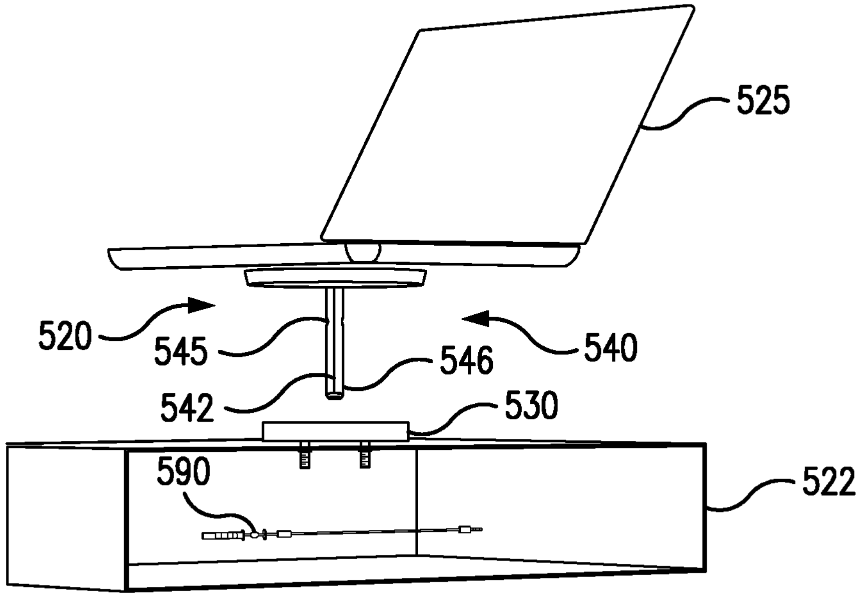
FIGS. 42-45 show a security device according to one embodiment of this invention.

The latch bolt 252 can be removed from the groove 246 to allow the stem 242 to lift within the base opening 234, such as shown in FIG. 29. The vertical movement allows a potential purchaser the ability to hold the product 225, for example to feel the weight of the product 225. The connector 240 adds minimal additional weight to the laptop, and does not have the downward pull of prior art cable retractors, thereby giving a more accurate feel of the device weight. The stem 242 further includes a stop element that limits the vertical lifting of the connector 240, and keeps the connector 240 from fully removing from the base 230. In FIGS. 28 and 29, the stop mechanism includes a pin 262 extending through an opening 245 in the stem 242. The pin 262 will not pass through the base opening 234, thus keeping the connector 240 connected. As shown, the stem 242 includes more than one opening 245, thus allowing the pin 262 to be moved and the stem lift height adjusted. Alternative mechanisms can be used for pin 262, such as a retractable element, for example as discussed for FIG. 41.

In embodiments of this invention, the locking mechanism desirably includes an electromechanical lock, such as incorporating an electromagnet for moving the latch bolt 252. The lock can be powered under the display, and include a manual release 254 that engages and disengages the latch bolt 252 as needed. For example, the connector 240 can be kept in the lockdown position of FIG. 28 until a potential purchaser wishes to better view the product 225. A store employee can release the latch 252 via button 254, or other equivalent release method discussed herein, to allow the lifting of the product 225. When the viewing is done, the latch 252 can be reengaged by again pressing the release button 254.

Figure 32:
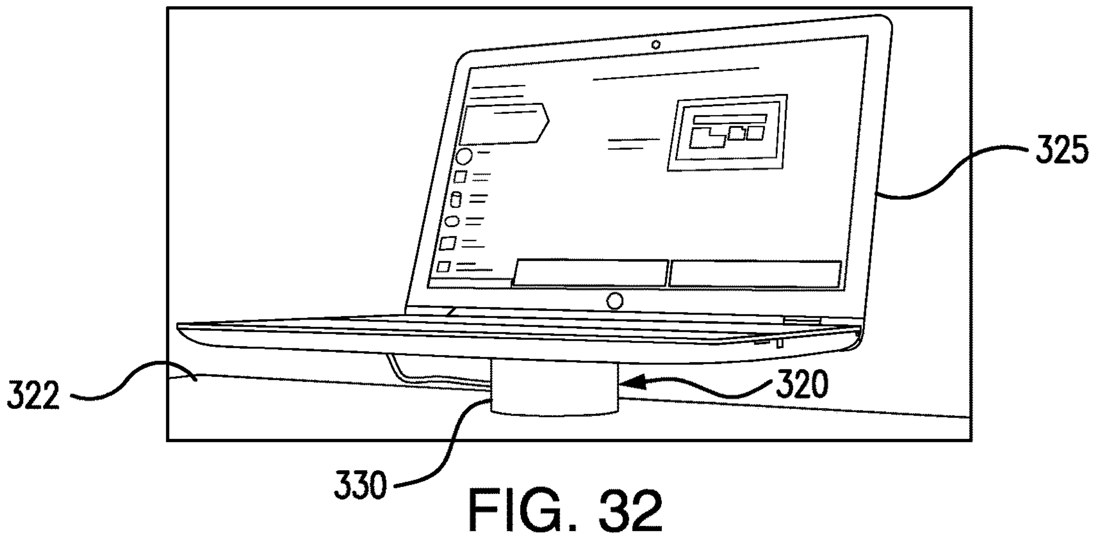
FIGS. 32-34 show a security device according to one embodiment of this invention.
Figure 33:
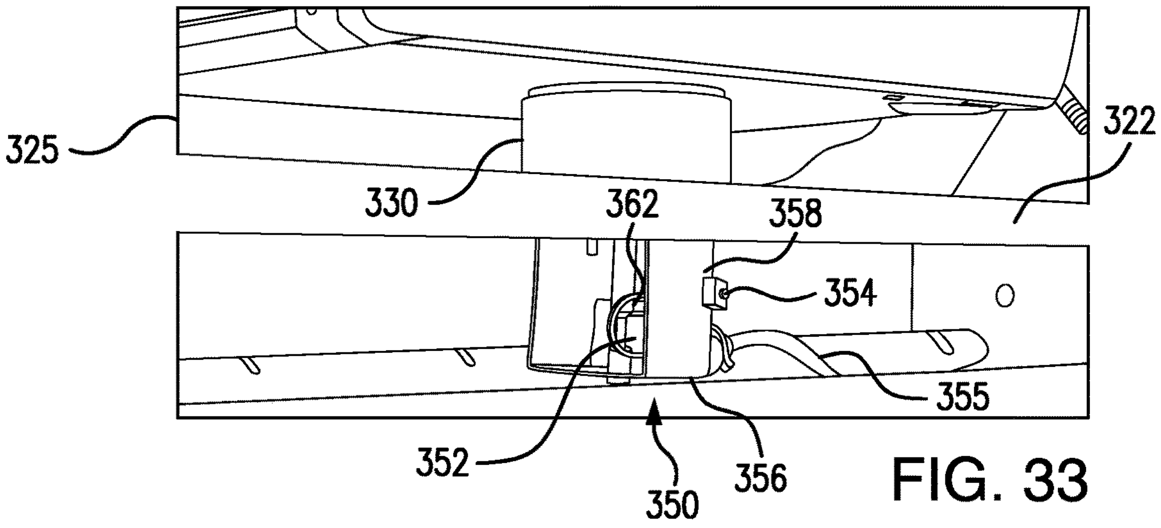
Figure 34:
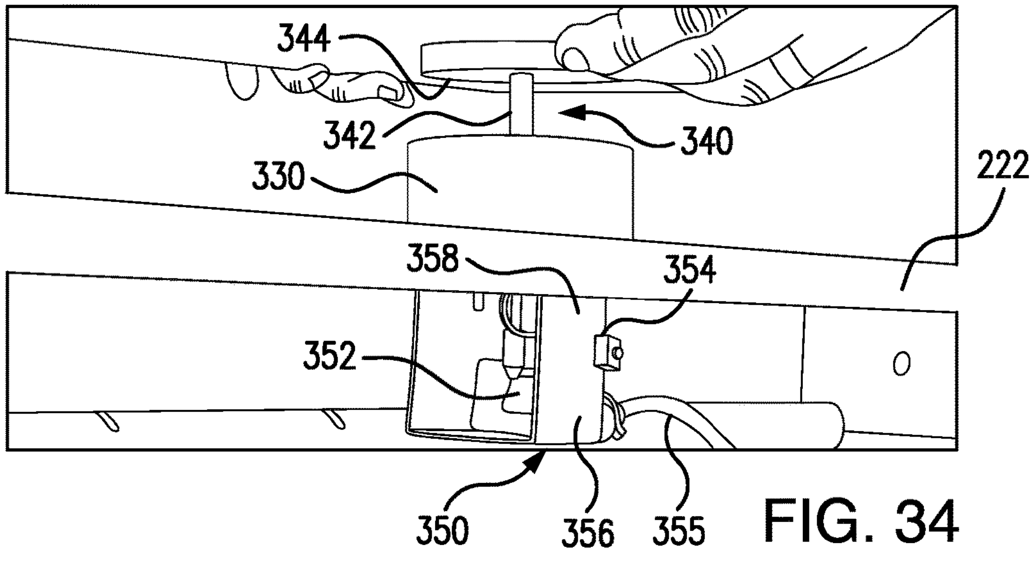

FIG. 32 shows a laptop 325 on a security device 320 according to another embodiment of this invention. The laptop 325, connected to connector head 344, sits on base 330 on display table surface 322. FIG. 33 shows the locking mechanism 350 under the display 322 and powered by cord 355, with latch bolt 352 engaged in a groove of the connector stem 342. The locking mechanism 350 is attached to the underneath surface of the display by mounting element 356, shown as a U-shaped bracket or housing. The actuation button 354 is on the outer surface 358 of the mounting element 356. FIG. 34 shows the latch bolt 352 released, and the connector 340 lifted. Pin 362 keeps the stem 342 from lifting out of the base 330.

Figure 35:
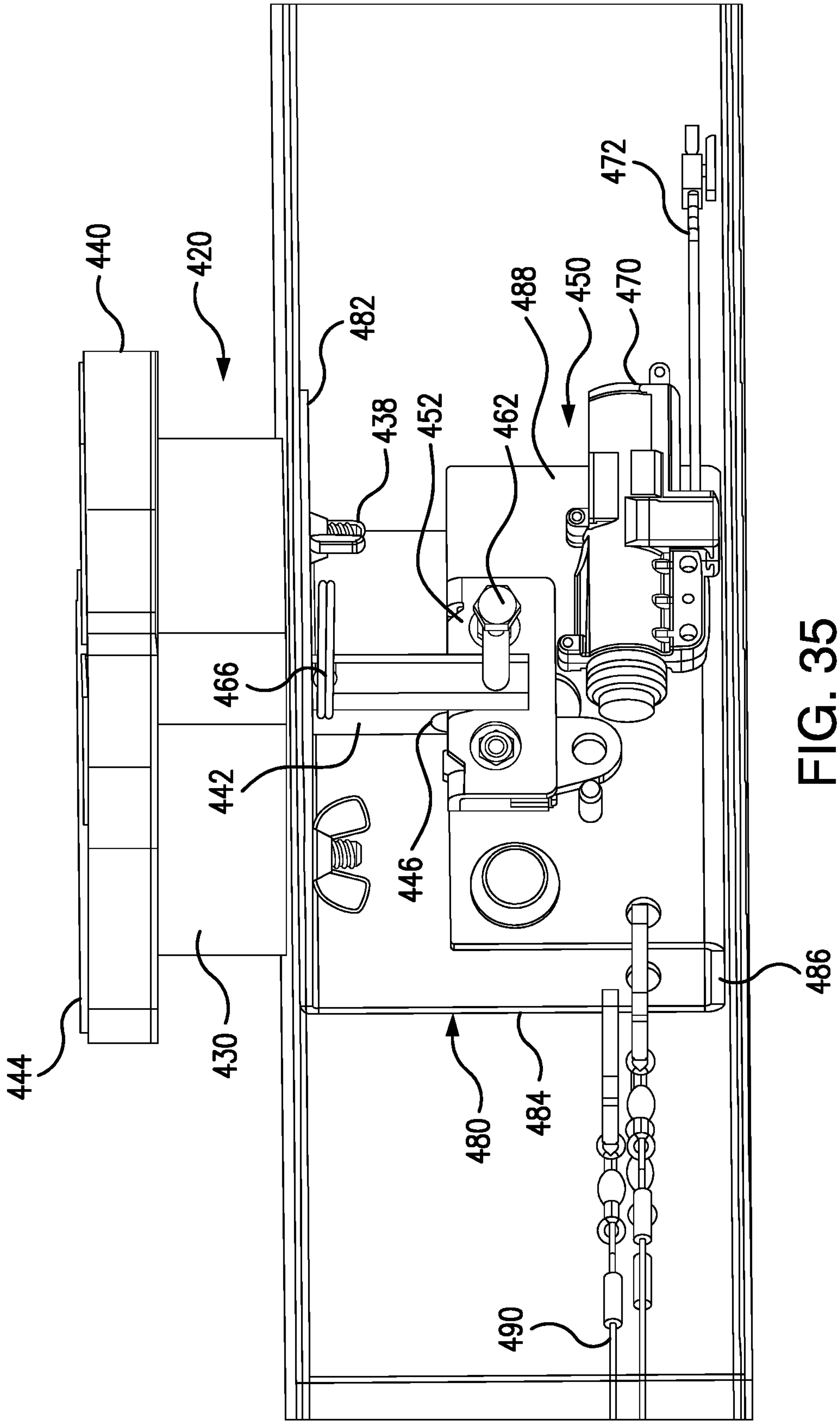
FIGS. 35-40 show a security device according to one embodiment of this invention.
Figure 36:
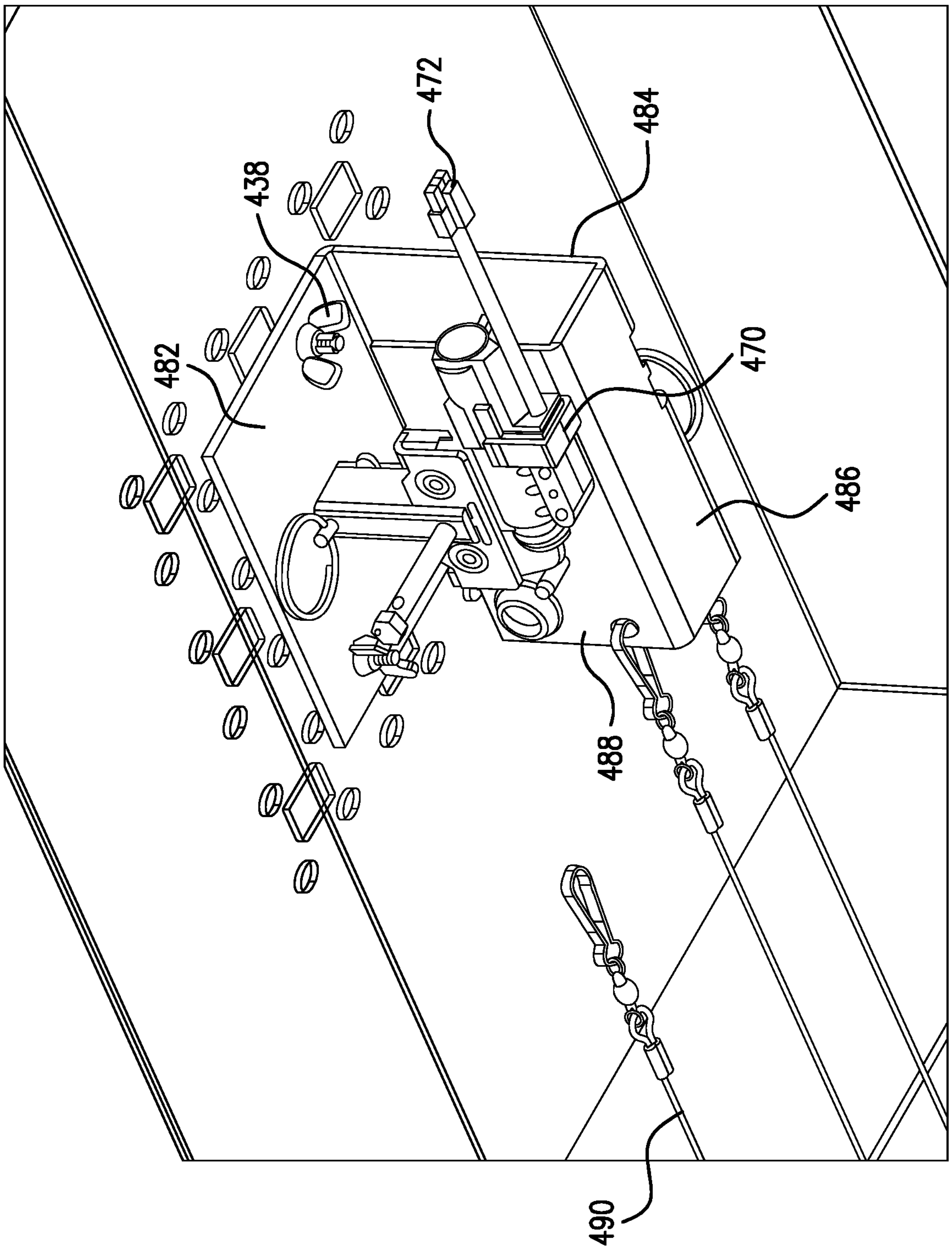
Figure 37:
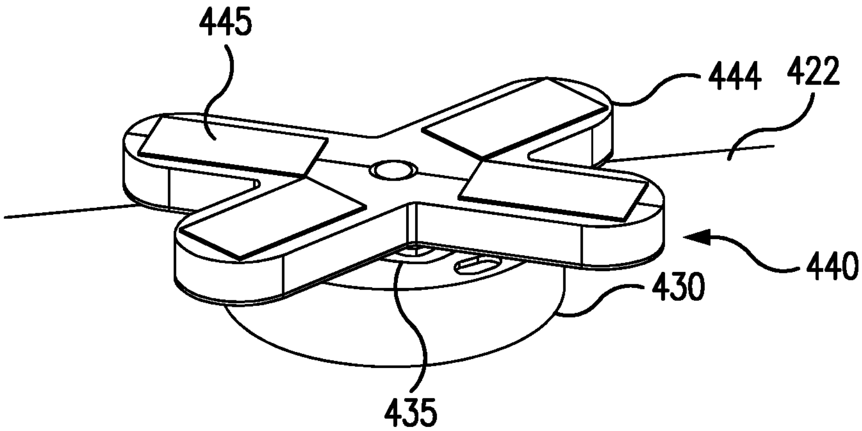
Figure 38:
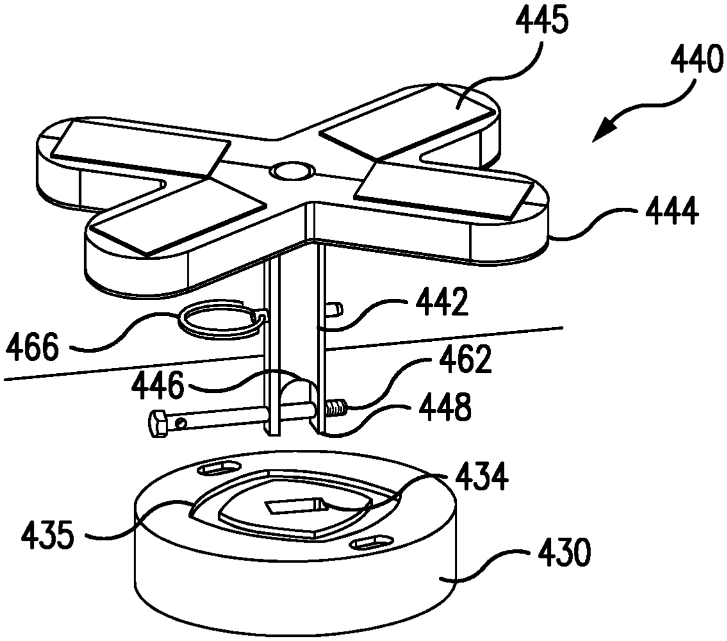
Figure 39:
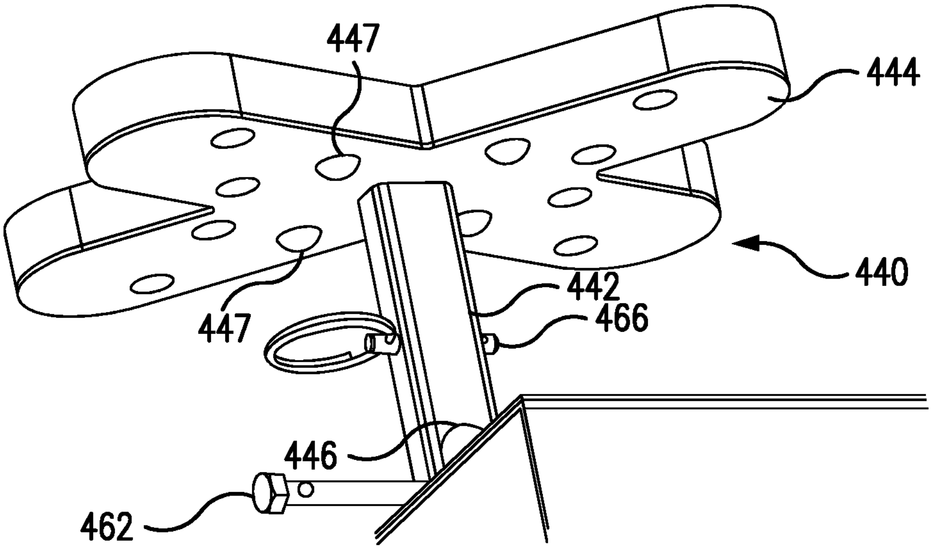

FIGS. 35-40 illustrate a security device 420 according to another embodiment of this invention. FIG. 35 shows the security device 420 with the connector 440 in a first position on the base 430. An X-shaped connector head 444, with four outwardly extending arms, attaches to a product (not shown) by adhesives 445, as shown in FIGS. 37 and 38. The connector head 444 in this embodiment sits atop the base 430, and can include an alignment structure that correspond to a matching alignment structure on the base top surface. As shown in FIGS. 38 and 39, the base 430 includes an arched square-shaped depression 435, and the bottom of the connector head 434 includes four raised dome/ball structures 447 which fit into the wider portions of the depression 435. The connector stem 442 is additionally non-round, and is shown as an I-beam configuration that fits within and through a rectangular base opening 434.

The connector 440 is locked in the first, lockdown position of FIG. 35 by locking mechanism 450. Locking mechanism 450 includes a moveable latch bolt 452 that slides over strike pin 462 of stem 442 to limit vertical movement of the stem 442 within the base opening 434. The locking mechanism 450 includes an electrically powered (e.g., electromagnetic) slide actuator 470, powered by cord 472, and including actuating button 474. The locking mechanism 450 is mounted to the display 422 by mounting plate 480. Mounting plate 480 is illustrated as a four-sided bent metal bracket, including a first side 482 mounted to the underside of display surface 422 by the threaded bolts 438 of the base 430. A second side 484 extends downward to bottom side 486, which has a size smaller than the first (top) side 482 and connects the second side 484 to parallel fourth side 486. Fourth side 486 extends upward adjacent to the stem 442, for holding the locking mechanism 450 adjacent to the stem 442.

Tethers 490 can be used to connect the mounting plate to secure loose or removable parts, such as any removable pin and/or striker bolt.

Figure 40:
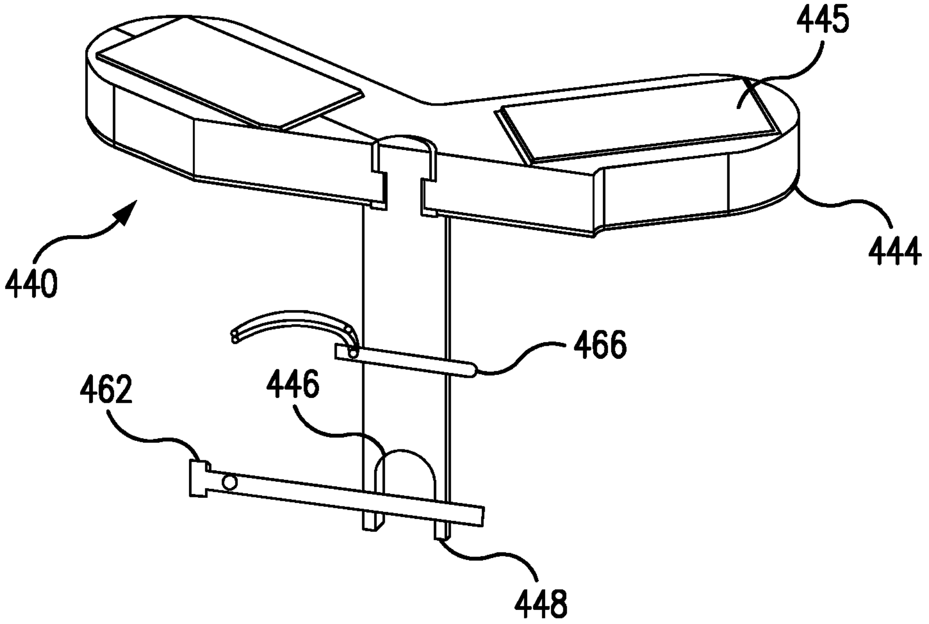

As shown in FIGS. 38-40, the stem 442 includes a slot 446 in the bottom surface 448 across which the strike pin 462 extends. Slot 446 extends over the locking mechanism 450 in the lockdown position, as shown in FIG. 35, such that strike pin 462 is within the locking mechanism 450. As discussed above, the strike pin 462 extends out past the stem 442 to also act as the mechanical stop for the lifting of the stem 442. FIGS. 35-40 also show an optional removeable top pin 466 which can be used to manually lockdown the stem, such as in case of a power failure. Alternatively, the invention can be implemented manually using the strike pin 462 and the top pin 466, without the locking mechanism 450.

A further alternative stem 442 is shown in FIG. 40, where the bottom or locking pin 466 is replaced by a retractable tooth 485, such as on a spring hinge 487. With tooth 485, the mounted device with stem 442 is placed into the base and the tooth retracts into slot 489 to pass through the opening 434 and then springs out on the underside 482 of the mounting plate 480 in the fixture to keep it within the base.

FIGS. 42-45 illustrate an additional embodiment of a security device 520 for a display surface 522 and attached to an electronic product 525. The security device 520 includes a base 530 connected to the display surface 522, and a connector 540 connected (e.g., adhesively) to the electronic product 525.

Figure 43:
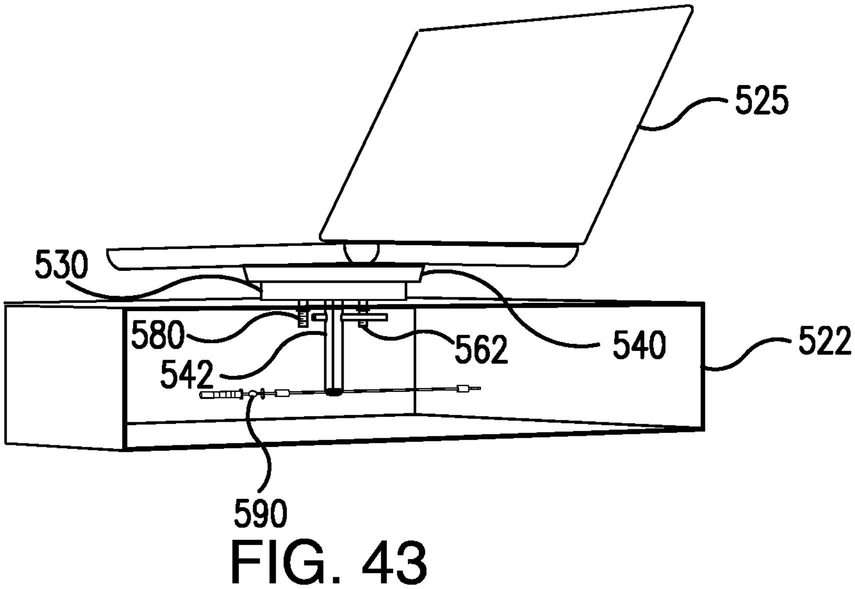

The connector 540 includes a stem 542 including an opening 545 for a removable pin 562. The removable (e.g., quick release) pin 562 is used to keep the stem 542 in a non-raiseable, lock-down position against the base 530, as shown in FIG. 43. A tether 590 can be attached between the pin 562 and the display or base 530 (e.g., via mounting plate 580) to keep the removed pin 562 from being lost. To lock down the product 525, the pin 562 is placed through opening 545, and desirably snap-locks in place such that it cannot be removed unless the display fixture is opened and a pin tooth is pushed in to be able to pull out the pin 562.

Figure 45:
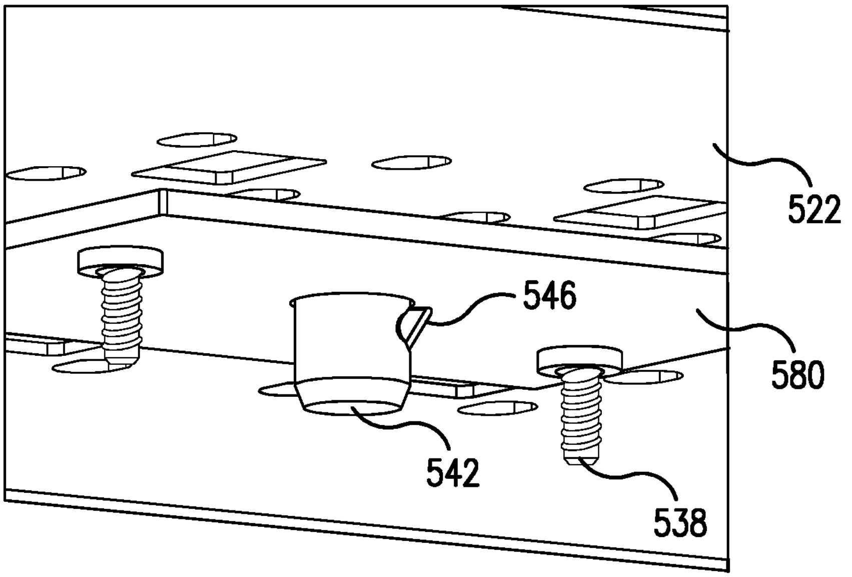

Lower on the stem 542 is a retractable tooth 546 that acts as the locking mechanism to keep the stem from lifting fully off the base 530. As shown in FIG. 45, the tooth 546 catches on the underside of the display surface 522, such as against a mounting plate 580 secured on base bolts 538 to keep the stem 542 from lifting out of the base opening 534. To move/remove the product 525 for re-merchandizing to another place, the retailer opens the display fixture, depresses the tooth 546 and lifts the product 525 and connector 540 from the base 530. In embodiments of this invention, the mounting plate 580 includes a graphic (e.g., a label) and/or a hole pattern specific to the display pattern of the retailer, such as to assist in locating the mounting plate and/or the base.

Figure 44:
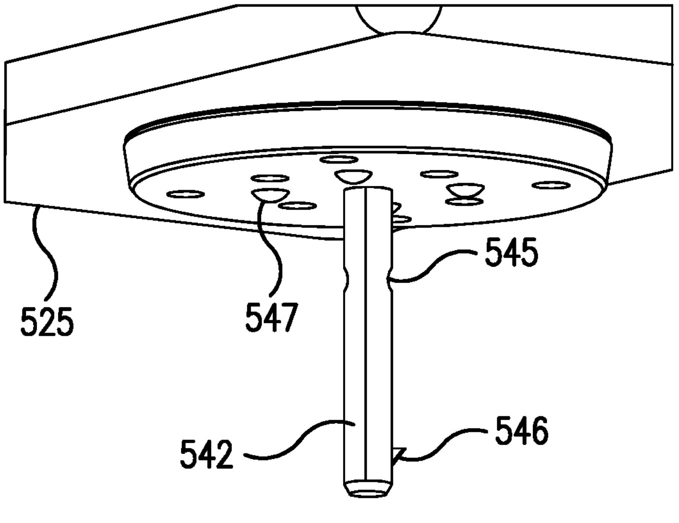
Figure 47:
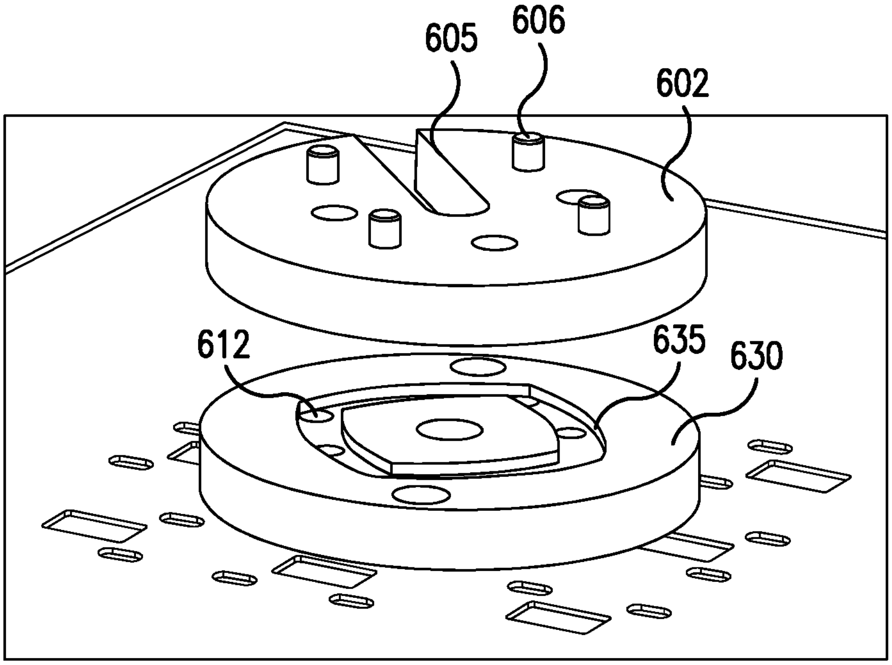

FIG. 44 shows an underside of the connector 540, including optional dome and/or ball structures 547 for centering and/or attraction to magnets on the base 530. FIG. 47 shows an exemplary corresponding arched square-shaped depression 635 for receiving the ball structures 547. In embodiments of this invention, the ball structures 547 are ball bearings that can roll on top of the base 530.

FIGS. 46-50 illustrate a security device with an optional removal tool 600 for removing an electronic device from the adhesive on a connector. The removal tool 600 uses the device, shown as laptop 625, and the base 630 as part of the removal action of the laptop 625 from the adhesive. The laptop 625 becomes the lever to provide force to overcome the adhesive connection.

Figure 46:
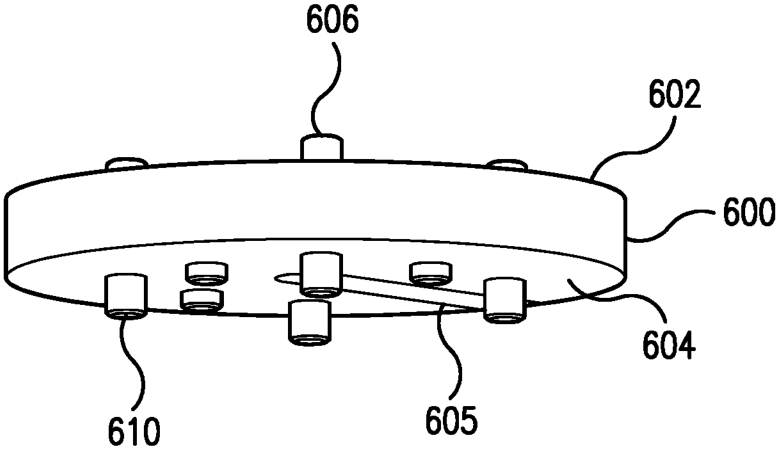
FIGS. 46-50 illustrate a removal tool according to an embodiment of this invention.
Figure 48:
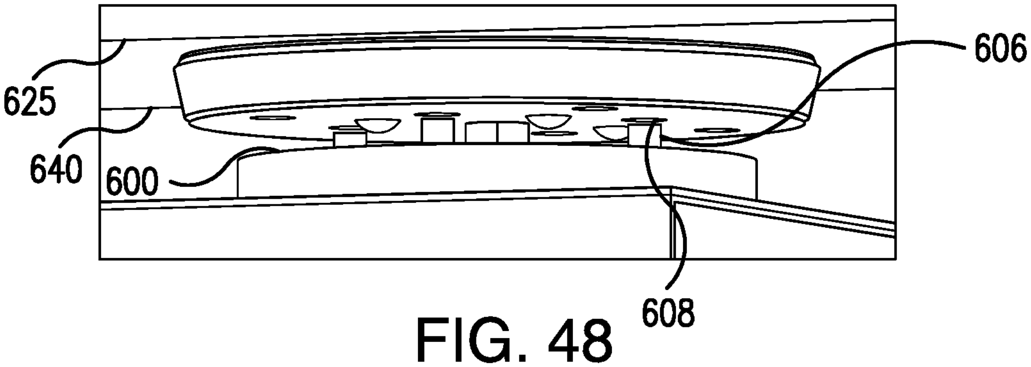

The removal tool 600 includes an upper surface 602 and a lower surface 604. The upper surface 602 includes upper extensions 606 in a pattern that matches and fits into a corresponding pattern of openings 608 within the underside of the connector 640. The lower surface 604 similarly includes lower extensions 610 in a pattern that matches and fits into a corresponding pattern of openings 612 within the top side of the base 630. As shown in FIGS. 46-48 the extensions 606 and 610 are cylindrical pegs, but any equivalent extensions can be used, such as square or triangular pegs, raised ridges, or a matching shape to depression 635, etc.

Figure 49:
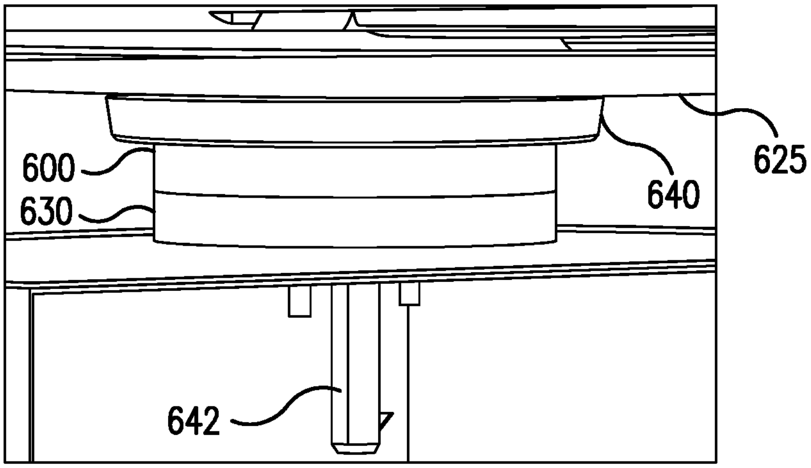
Figure 50:
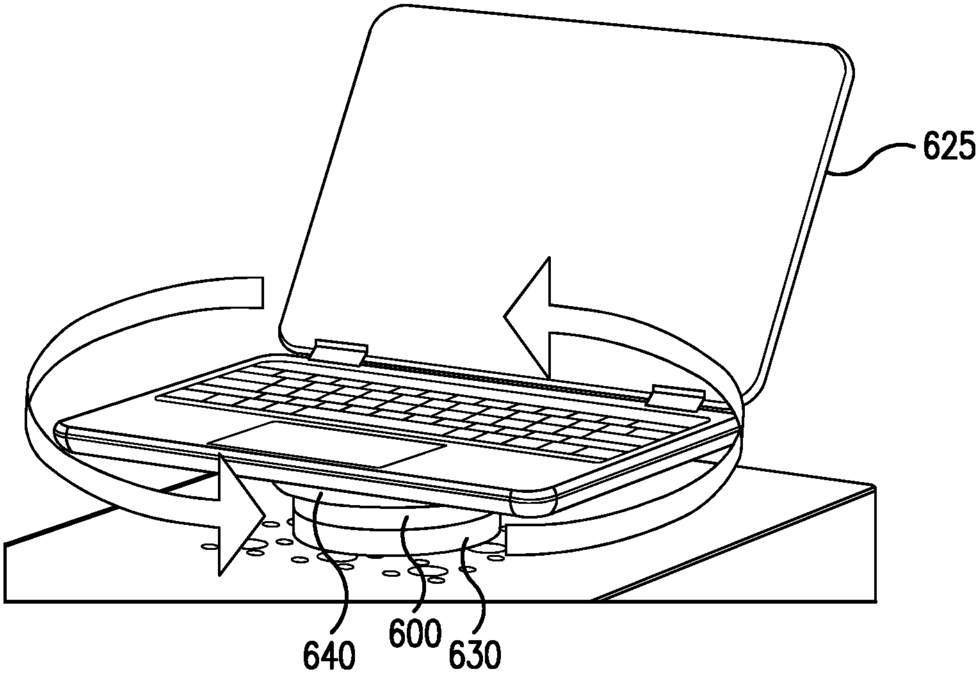

FIG. 48 shows the tool 600 added to the base 630, and the connector openings 608 of the connector 640 being aligned on the pegs 606 of the tool 600. Slot 605 allows the tool to fit around the stem 642. FIG. 49 shows the tool 600 between and mated with both the base 630 and connector 640. Once mated as in FIG. 49, the laptop 625 can be twisted as shown in FIG. 50 to remove the laptop from the adhesive connection. The tool 600 does not allow the connector 640 to rotate on the base 630, thereby causing the twisting forces to break the adhesive connection.

Thus the invention provides security devices incorporating a lockdown security feature. The lockdown features can be or include an electromagnet, such as in an electromagnetic latch. The lockdown mechanism can be used in addition to other security mechanisms to hold the security device in a locked position.

While in the foregoing detailed description the subject development has been described in relation to certain preferred embodiments thereof, and many details have been set forth for purposes of illustration, it will be apparent to those skilled in the art that the subject development is susceptible to additional embodiments and that certain of the details described herein can be varied considerably without departing from the basic principles of the invention.

We claim:

1. A security device for a retail store surface, the security device comprising:

a securing element moveable, relative the retail store surface, from a first position to a second position; and an electromagnetic lock configured to lock the securing element in the first position;

wherein the security device comprises a security gate, the security gate comprising:

a header;

at least one hinge arranged in a horizontal alignment with the header;

a rigid frame connected to the header with the at least one hinge, and moveable between the first position and the second position;

a guard positioned across the rigid frame, the guard preventing a user from removing the products; and a latching mechanism connecting the rigid frame to the header, wherein the latching mechanism is adapted to be released to move the rigid frame to the second position;

wherein the electromagnetic lock is configured to lock the rigid frame in the first position.

2. The security device of claim 1 wherein the electromagnetic lock comprises an electromagnet activated by an electric current.

3. The security device of claim 1 wherein the electromagnetic lock activates a lockdown in the first position.

4. The security device of claim 1 wherein the electromagnetic lock is behind the securing element and/or beneath the retail store surface.

5. The security device of claim 1 wherein the electromagnetic lock comprises a moveable latch configured to move into a lock position relative to a lock element.

6. The security device of claim 5 wherein the lock element comprises a pin or a groove.

7. The security device of claim 1 further comprising a release controller configured to activate or deactivate the electromagnetic lock.

8. The security device of claim 7 wherein the release controller comprises an electronic control system, wherein the electronic control system is in actuation combination with a further plurality of security devices.

9. The security device of claim 1 wherein the guard comprises a grate and/or a transparent shield.

10. The security device of claim 1 wherein the electromagnetic lock comprises a mechanical latch on one of the header or the rigid frame and a lock element on an other of the header or the rigid frame.

11. The security device of claim 10 wherein the latching mechanism comprises a pin having a knob at an outer end and an engageable detent at an inner end wherein a spring is positioned between the knob and the detent to permit release of the latching mechanism.

12. The security device of claim 1 further comprising a sensor connected with respect to an alarm, wherein the alarm is activated when the sensor determines that an alarming condition is met, and the alarming condition is at least one of: release of the latching mechanism one time; release of the latching mechanism X times; and a time delta t between when the latching mechanism is released and relatched.

13. The security device of claim 12 wherein a format of the alarm changes based on a number of security gates that are open simultaneously.

14. The security device of claim 1 further comprising a pull handle distinct from the latching mechanism, wherein the pull handle is located at an opposite edge of the guard as the latching mechanism.

15. The security device of claim 1 wherein the latching mechanism is configured to require a user to use two hands to open the security gate, one hand on the latching mechanism and the other hand to pull the rigid frame and/or the guard upward relative to the shelf.

16. A security gate for a retail store surface, the security gate comprising:

a header;

at least one hinge arranged in a horizontal alignment with the header;

a rigid frame connected to the header with the at least one hinge, and moveable, relative the retail store surface, between a first position and a second position;

a guard positioned across the rigid frame, the guard preventing a user from removing the products;

a latching mechanism connecting the rigid frame to the header, wherein the latching mechanism is adapted to be released to move the rigid frame to the second position; and an electromagnetic lock configured to lock the rigid frame in the first position.

17. The security gate of claim 16 wherein the electromagnetic lock comprises a mechanical latch on one of the header or the rigid frame and a lock element on an other of the header or the rigid frame.

18. The security gate of claim 16 wherein the latching mechanism comprises a pin having a knob at an outer end and an engageable detent at an inner end wherein a spring is positioned between the knob and the detent to permit release of the latching mechanism.

19. The security gate of claim 18, wherein the electromagnetic lock comprises a mechanical latch configured to secure the pin in a locked position.

20. The security gate of claim 16 further comprising a pull handle distinct from the latching mechanism, wherein the pull handle is located at an opposite edge of the guard as the latching mechanism.

* * * * *